United States Patent
Boduch et al.

(10) Patent No.: US 9,455,779 B2
(45) Date of Patent: Sep. 27, 2016

(54) METHOD AND APPARATUS FOR PERFORMING PATH PROTECTION FOR RATE-ADAPTIVE OPTICS

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

( * ) Notice: Subject to any disclaimer, the term of this patent is extended or adjusted under 35 U.S.C. 154(b) by 0 days.

(21) Appl. No.: 14/954,324

(22) Filed: Nov. 30, 2015

(65) Prior Publication Data

US 2016/0080075 A1 Mar. 17, 2016

Related U.S. Application Data

(63) Continuation of application No. 13/962,397, filed on Aug. 8, 2013, now abandoned.

(51) Int. Cl.
| | |
|---|---|
| H04B 10/00 | (2013.01) |
| H04J 14/00 | (2006.01) |
| H04J 14/02 | (2006.01) |
| H04B 10/032 | (2013.01) |
| H04B 10/038 | (2013.01) |
| H04B 10/40 | (2013.01) |

(52) U.S. Cl.
CPC .......... *H04B 10/032* (2013.01); *H04B 10/038* (2013.01); *H04B 10/40* (2013.01); *H04J 14/026* (2013.01); *H04J 14/0287* (2013.01); *H04B 2201/70703* (2013.01)

(58) Field of Classification Search
CPC .................................................. H04B 10/038
See application file for complete search history.

(56) References Cited

U.S. PATENT DOCUMENTS

| | | | |
|---|---|---|---|
| 6,172,782 B1 | 1/2001 | Kobayashi | |
| 6,192,045 B1 | 2/2001 | Williams et al. | |
| 7,035,323 B1* | 4/2006 | Arato | H04L 25/14 375/219 |
| 7,099,578 B1* | 8/2006 | Gerstel | H04J 14/0295 370/216 |
| 8,045,854 B2 | 10/2011 | Colbourne | |
| 8,165,468 B2 | 4/2012 | Boduch et al. | |
| 8,233,794 B2 | 7/2012 | Colbourne et al. | |
| 8,391,709 B2 | 3/2013 | Colbourne et al. | |
| 8,447,183 B2 | 5/2013 | Boduch et al. | |
| 2001/0034209 A1* | 10/2001 | Tong | H04L 1/0002 455/69 |
| 2002/0067883 A1 | 6/2002 | Lo | |
| 2003/0161629 A1 | 8/2003 | Frascolla et al. | |
| 2004/0157560 A1* | 8/2004 | Yamasaki | H04L 1/0003 455/63.1 |
| 2005/0238357 A1* | 10/2005 | Farrell | H04B 10/1123 398/119 |

(Continued)

FOREIGN PATENT DOCUMENTS

| | | |
|---|---|---|
| EP | 1 054 524 A3 | 1/2005 |
| JP | 11068656 | 3/1999 |

OTHER PUBLICATIONS

Zhou et al., Rate-Adaptable Optics for Next Generation Long-Haul Transport Networks, IEEE, Mar. 2013, pp. 41-49.*

(Continued)

*Primary Examiner* — Ken N Vanderpuye
*Assistant Examiner* — Jai Lee

(57) ABSTRACT

A method and apparatus for performing path protection for rate-adaptive optics is provided. As part of the method, an aggregate input bit stream is received. The aggregate input bit stream is then transmitted using a rate-adaptive optical transceiver when transmitting on a first optical path. When the first optical path has a fault, the aggregate input bit stream is then transmitted on a second optical path using the rate-adaptive optical transceiver and a fixed-rate optical transceiver.

21 Claims, 10 Drawing Sheets

(56) References Cited

U.S. PATENT DOCUMENTS

| | | | |
|---|---|---|---|
| 2006/0133804 A1 | 6/2006 | Boduch et al. | |
| 2007/0274718 A1* | 11/2007 | Bridges | H04J 3/1694 398/63 |
| 2013/0039643 A1* | 2/2013 | Tokura | H04B 10/032 398/7 |
| 2013/0209091 A1* | 8/2013 | Mateosky | H04B 10/07953 398/26 |
| 2013/0272698 A1* | 10/2013 | Jin | H04L 27/2628 398/43 |
| 2013/0322885 A1* | 12/2013 | Chow | H04L 7/0337 398/135 |

OTHER PUBLICATIONS

Xiang Zhou et al., Rate-Adaptable Optics for Next Generation Long-Haul Transport Networks. Published in: IEEE Communications Magazine • Mar. 2013.

Jim Jachetta, National Association of Broadcasters Engineering Handbook, Chapter 6.10, Fiber-Optic Transmission Systems, 2007, Fig. 6.10-1, p. 201,208.

Gerstel O. et al., Optical layer survivability-an implementation perspective. Published in: Selected Areas in Communications, IEEE Journal on (vol. 18, Issue: 10 ).

\* cited by examiner

METHOD AND APPARATUS FOR PERFORMING PATH PROTECTION FOR RATE-ADAPTIVE OPTICS

RELATED APPLICATION

This application is a continuation of U.S. application Ser. No. 13/962,397, filed Aug. 8, 2013. The specification of the present invention is substantially the same as that of the parent application. The "Related Application" paragraph has been revised to include a specific reference to the parent application. The specification of the present invention contains no new subject matter.

TECHNICAL FIELD OF THE INVENTION

The present invention relates generally to optical path protection, and more specifically to a method and an apparatus for performing optical path protection when using rate-adaptive optics.

BACKGROUND

A rate-adaptive optical transceiver is an optical transceiver that is able to adapt its transmittable bit rate in response to changes in the network in which it is operating. Such a transceiver is able to transmit and receive at two or more distinct bit rates. Typically, in order to transmit at a higher bit rate, more advanced modulation techniques are often needed. The drawback of these more advanced modulation techniques is that they require a larger optical signal-to-noise ratio (OSNR), and this reduces the distance over which the signal can be transmitted. The net result of this (in overly simplistic terms) is that the rate-adaptive optical transceiver is able to transmit at a high bit rate over a short distance, and is able to transmit at a low bit rate over a long distance. If a rate-adaptive optical transceiver is transmitting at a high bit rate over a short optical path, and that path later fails so that the transceiver must now transmit over a longer path in order to get around the failure, then the transceiver may be required to lower its bit rate in order to transmit over the new distance. At this point, the original transceiver must either drop some of the lower priority traffic it is transmitting, or move some of its traffic to another optical transceiver.

SUMMARY

A method and apparatus for performing path protection for rate-adaptive optics in accordance with example embodiments of the present invention is provided. This method employs fixed-rate optics to assist rate-adaptive optics in the presence of optical path failures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
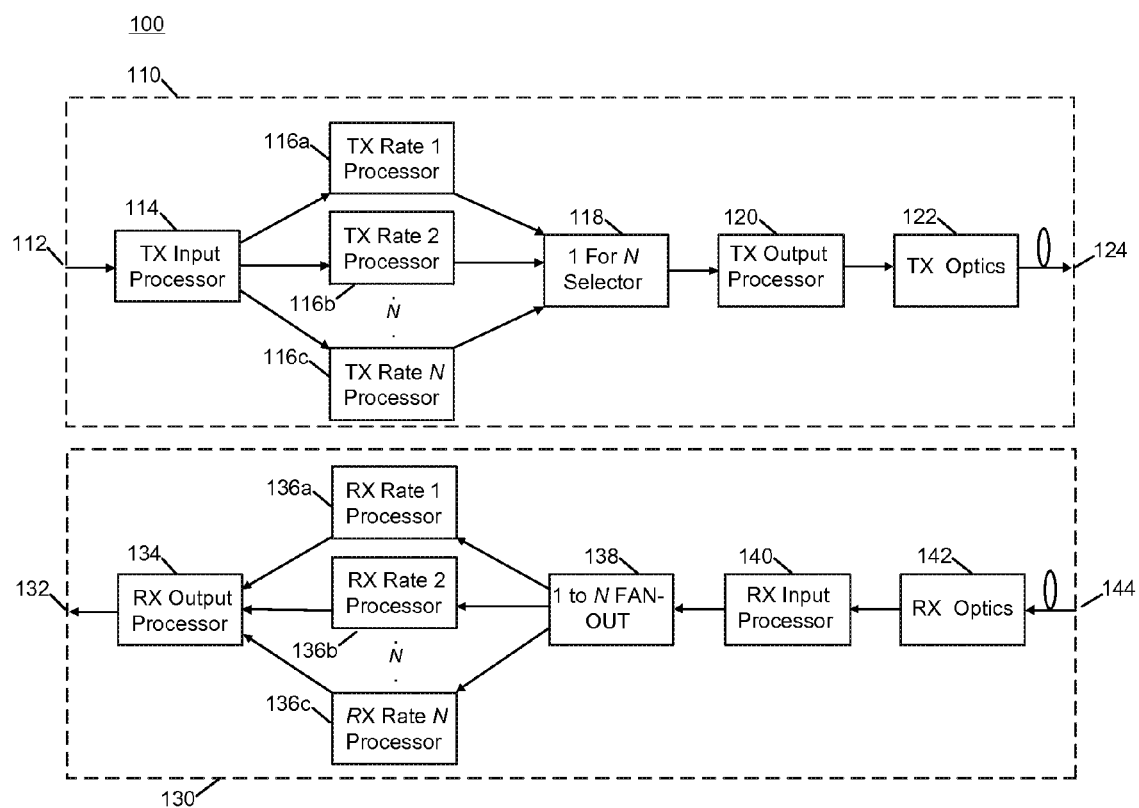
FIG. 1 is an illustration of generalized rate-adaptive optical transceiver.

A description of example embodiments of the invention follows. FIG. 1 shows a block diagram of a generalized rate-adaptive optical transceiver 100. The transceiver comprises a transmitter (TX) 110 and a receiver (RX) 130.

The transmitter 110 receives an electrical input data stream at input 112, and forwards that input stream to the TX input processor 114. The TX input processor 114 may reformat the input data, and may add Forward Error Correction bits and perform other user specific function. The TX input processor 114 then directs the input data to one or more TX rate processors 116a-c. In the rate-adaptive optical transceiver 100, there are N TX rate processors shown 116a-c. Each of the N TX rate processors 116a-c is capable of generating an output bit stream at a different bit rate. For example, the TX Rate 1 Processor 116a may be capable of generating an output bit stream at a higher rate than the TX Rate 2 Processor 116b, while the TX Rate 2 Processor 116b may be capable of generating an output bit stream at a higher rate than the TX Rate N Processor 116c. For these cases the TX Rate 1 Processor 116a may use a first modulation format, the TX Rate 2 Processor 116b may use a second modulation format, and the TX Rate N Processor 116c may use a third modulation format. For example, the first modulation format may be a PAM-16 modulation (16-level Pulse-Amplitude Modulation) format, the second modulation format may be a PAM-4 modulation format, and the third modulation format may be a PAM-2 modulation format. The PAM-16 modulation format transmits four bits of information per symbol, the PAM-4 modulation format transmits two bits of information per symbol, and the PAM-2 modulation format transmits one bit of information per symbol. Therefore, in this example, if all three TX rate processors 116a-c are transmitting at the same symbol rate, the TX Rate 1 processor 116a (using PAM-16) can transmit at a bit rate that is twice the rate of the TX Rate 2 processor 116b (using PAM-4), and the TX Rate 2 processor 116b (using PAM-4) can transmit at a bit rate that is twice the rate of the TX Rate N processor 116c (using PAM-2). However, for a given fiber type, since the PAM-16 modulation format requires a higher OSNR to transmit error free than the PAM-4 modulation format, the distance achieved by the PAM-16 format will generally be less than the distance achieved by the PAM-4 format. This is due to the fact that longer distances require higher amounts of optical amplification, and this generally lowers the OSNR of a given signal.

Although the previous example discussed the operation of the TX rate processors using various PAM-n modulation formats, the TX rate processors are not limited to PAM-n modulation formats, and in fact each TX rate processor may use any implementable modulation format, including, but not limited to Quadrature Phase Shift Keying (QPSK), and various Quadrature Amplitude Modulation (QAM) formats (8QAM, 16QAM, etc.). Also, the various rate processors within the rate-adaptive optical transceiver need not have the same symbol rate.

A 1 for N selector 118 is used to select between the various bit rates of the various TX rate processors. For a given optical path, the 1 for N selector 118 is configured to forward one of the N bit rates to the TX output processor 120. The TX output processor may additionally format the electrical signal prior to forwarding it to the TX optics 122. The TX optics 122 uses a laser to convert the electrical signal from the output processor 120 to an optical signal of a configurable wavelength (frequency). In addition, the laser can be turned off, so that no light emits from the output 124 of the rate-adaptive optical transceiver 100.

The receiver 130 receives an optical input data stream at optical input 114. The optical input data stream is converted into an electrical data stream by the Receiver (RX) optics 142, and it is then forwarded to the RX input processor 140 for any preliminary processing (equalization, phase recovery, etc.) prior to being forwarded to the 1 to N fan-out circuitry 138. The 1 to N fan-out circuitry 138 either selectively forwards it inputted data to one or more of the plurality of RX rate processors 136a-c, or broadcasts its inputted data to all of the RX rate processors. Each of the N RX rate processors 136a-c demodulates the incoming signal according to its corresponding modulation format, and produces an outgoing bit stream according to is corresponding rate capabilities. In general, there is a one-to-one matching of each RX rate processor 136a-c to a corresponding TX rate processor 116a-c. Therefore, for example if TX rate processor 116a produces a 50 Gbps data stream using a PAM-4 format, then the corresponding RX rate processor 136a demodulates its incoming signal using a PAM-4 demodulator, and produces a corresponding 50 Gbps data stream. The RX rate processor that processes the corresponding receiver signal forwards its output data to the RX output processor 134. The RX output processor 134 preforms any final processing on the signal (such as FEC decoding, for example), and forwards the resulting electrical signal to its output port 132.

If the rate-adaptive optical transceiver is operating at a first bit rate $r_1$, over a first distance $d_1$, over a first optical path, and then if a fault occurs on the first optical path such that the transceiver must now transmit over a second optical path over a second distance $d_2$, wherein $d_2 > d_1$, then the transceiver may need to switch to a second bit rate $r_2$, wherein $r_2 < r_1$. This is done by selecting a different rate processor within the optical transceiver.

Figure 2:
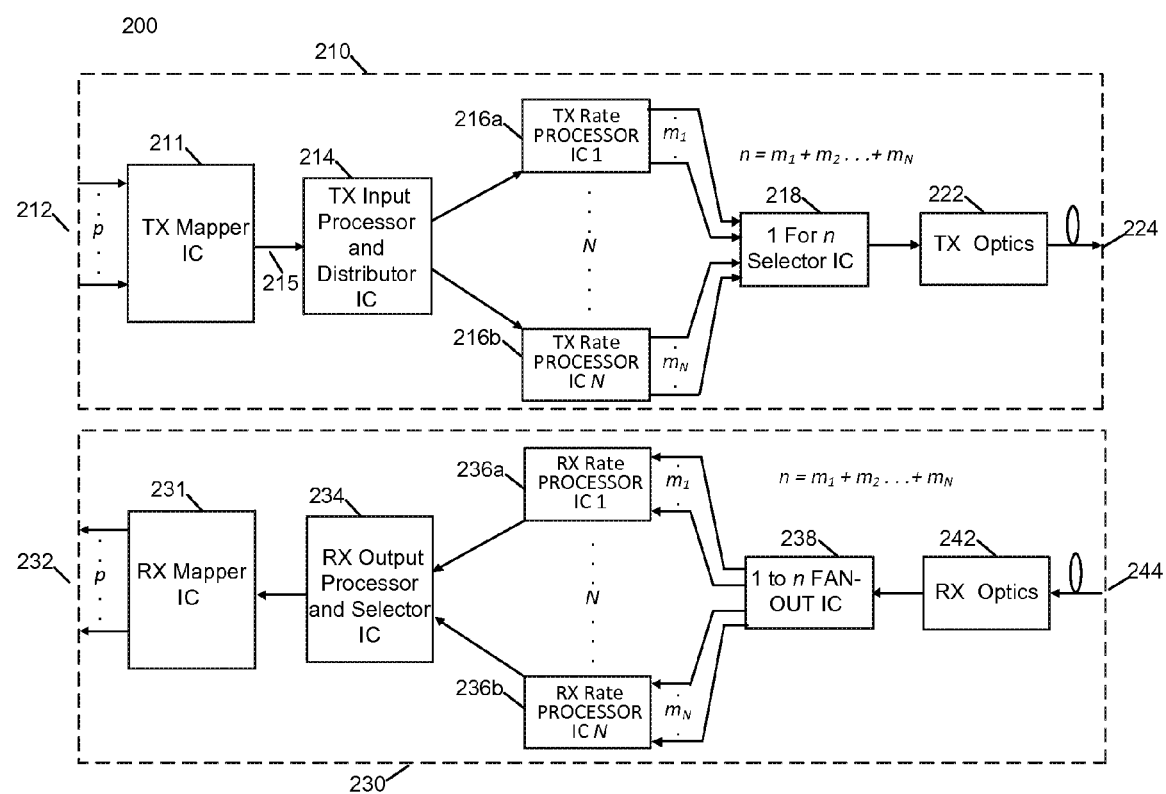
FIG. 2 is a detailed illustration of a first embodiment of a rate-adaptive transceiver.

FIG. 2 shows a detailed block diagram of a first embodiment of a rate-adaptive optical transceiver 200, comprising a transmitter (TX) 210 and a receiver (RX) 230. Both the transmitter 210 and the receiver 230 may include a variety of integrated circuit devices (ICs), as shown in FIG. 2. Alternatively, the various functions could be consolidated into a single IC or in some number of ICs less than that shown in FIG. 2. For example, both some number of TX rate processors and RX rate processors could be consolidated into a single IC, and or the TX Mapper and RX Mapper functions could be consolidated into a single IC.

The transmitter 210, comprises a group of p input ports 212, a TX mapper IC 211, a TX input processor and distributor IC 214, N number of TX rate processor ICs 216a-b, a 1-for-n selector IC 218, TX optics 222, and an optical output port 224. Up to p number of input data streams is received at the group of p input ports 212. These data streams may be mapped by the TX mapper IC 211 into transport units such as the optical data units ODUs defined by ITU-T Recommendation G.709. The TX mapper IC may further perform such functions as error checking and performance monitoring. The mapper IC 211 aggregates the group of p input streams into one aggregate input bit stream 215, and may further add forward error correction bytes to the stream before forwarding the stream 215 to the TX input processor and distributor IC 214. The TX input processor and distributor IC 214 may further format the aggregate input bit stream 215 in accordance to the individual requirements of each TX rate processor 216a-b. Following any further formatting, the TX input processor and distributor IC 214 forwards the "processed" aggregate input bit stream 215 to one of the N TX rate processor ICs 216a-b.

The TX rate processor ICs perform the same function as described in reference to the TX rate processors 116a-c of FIG. 1. A given TX rate processor performs any "rate specific" and "modulation specific" processing and formatting required for its specific output bit rate, while mapping the received aggregate input bit stream to its output bit stream. For instance, for a PAM-16 modulation format, the corresponding TX rate processor would need to parse the aggregate input bit stream into four-bit symbols as part of the processor's functionality. The TX rate processor with the highest output bit rate would be designed to transmit the maximum aggregate bit rate received from the group of p input ports 212.

Each TX rate processor IC may support $m_i$ number of different physical formats for its output signals. For instance a given TX rate processor may support both a 10 Gbps serial format and a 28 Gbps physical format, each of which may require different serializer/deserializer devices (SERDES) within the IC—resulting in separate pins for the 10 Gbps and 28 Gbps signals. If there are N TX rate processor ICs—each with $m_i$ number of different physical formats—then the total number of physical transmission entities outputted by the group of TX rate processors is equal to: $\Sigma_1^N m_i = n$. Therefore, in order to select from n number of physical transmission entities, a 1-to-n selector IC 218 is required. The 1-to-n selector IC is configured to select and forward the bit stream of the physical transmission entity corresponding to the rate used to transmit the aggregate input bit stream 215 from the transmitter 210 of the rate-adaptive optical transceiver. The selected bit stream is then forwarded from the selector 218 to the TX optics 222—for conversion from electrical to optical format—and then outputted on optical output 224.

The receiver 230 comprises a group of p output ports 232, an RX mapper IC 231, an RX output processor IC 234, N number of RX rate processor ICs 236a-b, a 1-to-n fan-out IC 238, RX optics 242, and an optical input port 244. An optical signal is received at input 244, and it is converted to electrical format by the RX optics 242, and then forwarded to the 1-to-n fan-out IC 238. The fan-out IC 238 is configured to forward its received signal to one of the n physical transmission entities of the N RX rate processor ICs 236a-b. If there are N RX rate processor ICs—each with $m_i$ number of different physical formats—then the total number of physical transmission entities outputted by the 1-to-n fan-out IC 238 is equal to: $\Sigma_1^N m_i = n$. Therefore, in order to forward to n number of physical transmission entities, a 1-to-n fan-out IC is required. In its simplest form, the 1-to-n fan-out IC 238 simply broadcasts its received signal to all n of its outputs. A more sophisticated fan-out IC selectively sends its received signal to one or more particular outputs, and sends no signal to its other outputs.

The N RX rate processor ICs 236*a-b* behave in the same manner as the corresponding rate RX processors of FIG. 1. A given RX rate processor performs any "rate specific" and "de-modulation specific" processing and formatting required for its specific input bit rate, while mapping the received input bit stream to its output bit stream. The RX rate processor with the highest input bit rate would be designed to receive the maximum aggregate bit rate transmitted to the group of p output ports 232.

The RX output processor and selector IC 234 selects the output stream from the RX rate processor that is actively processing the input signal of the receiver, and performs any required formatting of the signal, prior to forwarding the signal to the RX mapper IC 231. The RX mapper IC 231 may perform forward error correction on the signal it receives from the RX output processor. The signal from the RX output processor may be partitioned into multiple transport units such as the optical data units ODUs defined by ITU-T Recommendation G.709. The RX mapper IC de-maps the native signals from the transport units, and then forwards the de-mapped signals to the appropriate output ports 232 of the receiver.

Figure 3:
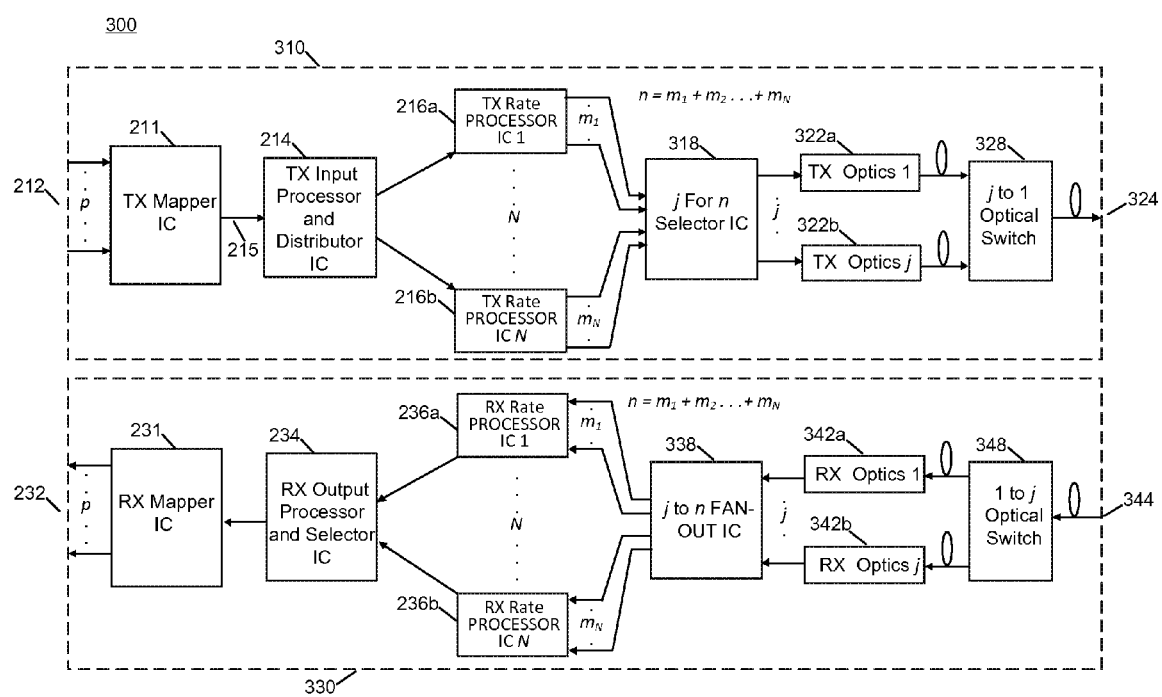
FIG. 3 is a detailed illustration of a second embodiment of a rate-adaptive transceiver.

FIG. 3 is a detailed block diagram 300 of a second embodiment of a rate-adaptive transceiver. It includes a transmitter (TX) block 310 and a receiver block 330. The rate-adaptive optical transceiver 300 is identical to the rate-adaptive optical transceiver 200 except in regards to the circuitry residing between the rate processors 216*a-b*, 236*a-b* and the optical input/outputs 224, 244, 324, and 344. In 300, there are j number of TX optical blocks 322*a-b* (instead of only one 222), and there are j number of RX optical blocks 342*a-b* (instead of only one 242). Each of the j TX optics 322*a-b* and RX optics 342*a-b* operate over a specific range of rates (or in the simplest case, operate at a single rate). In order to accommodate the additional optics, a j-for n selector IC 318 is used (instead of 1-for n selector IC 218), and a j-to-n fan-out IC 338 is used (instead of a 1-to-n fan-out IC 238). In addition, a j-to-1 optical switch 328 is needed to select from the various TX optics before outputting the selected signal to output port 324, and a 1-to-j optical switch is needed in order to forward the optical signal from the input port 344 to the correct RX optics 342*a-b*. The adaptive-rate optical transceiver 300 may be used when a single set of optics is not able to support all of the desired rates of the transceiver.

A variant of the rate-adaptive optical transceiver may include a transceiver that has a single TX optics, but multiple RX optics, or vice versa. A second variant of the rate-adaptive optical transceiver may include a rate-adaptive optical transceiver wherein each of its rate processors is paired directly with specific TX and RX optics—thus eliminating the need for a j-for-n selector IC and a j-to-n fan-out IC.

Figure 4:
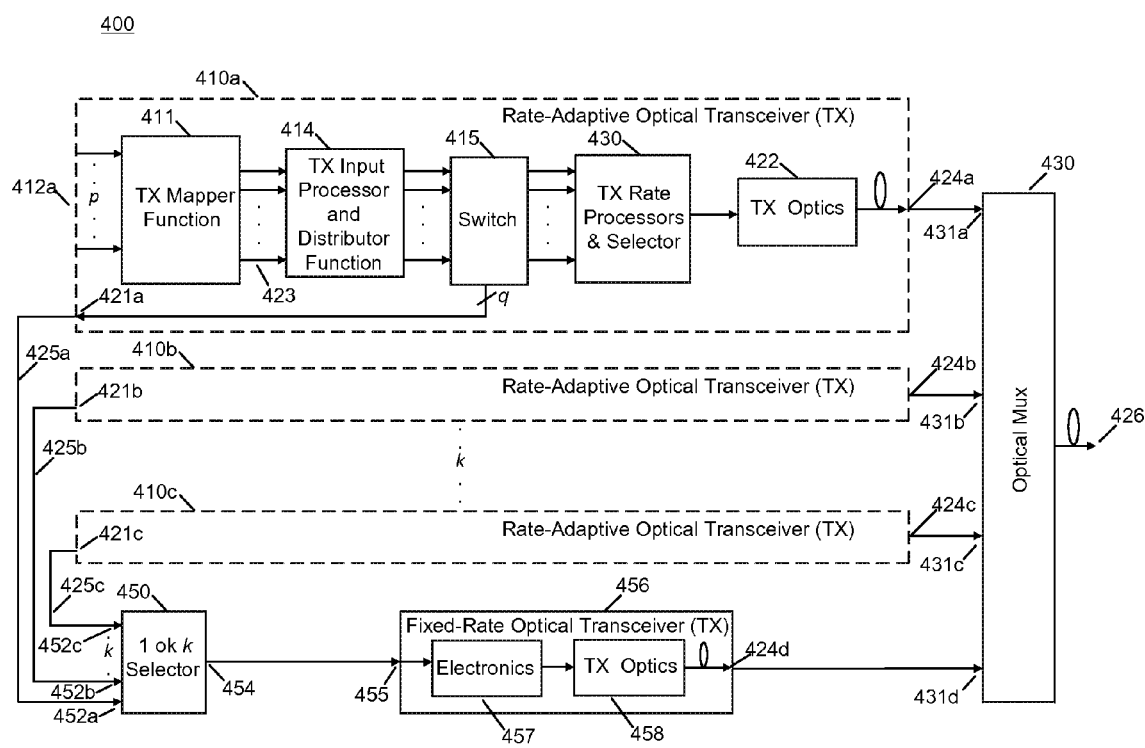
FIG. 4 is a first embodiment of the transmitter portion of an apparatus for performing path protection for rate-adaptive optics.

FIG. 4 is a first embodiment of the transmitter portion of an apparatus for performing path protection for rate-adaptive optics 400. The apparatus 400 is appropriate to use when protecting paths that begin and end on the same optical fiber. Therefore, the apparatus only requires a single network (NW) output 426. The transmitter portion of the apparatus for performing path protection for rate-adaptive optics 400 comprises one or more rate-adaptive optical transceivers (TX) 410*a-c*, at least one fixed-rate optical transceiver (TX) 456, an optical mux 430, a selector 450, a group of input ports 412*a* for each rate adaptive optical transceiver (not shown on transceivers 410*b* and 410*c*), and an optical output port 426.

Each rate-adaptive optical transceiver (TX) 410*a-c* comprises a group of inputs ports 412*a* (only shown for 410*a*), a TX mapper function 414 (only shown for 410*a*), a switch 415 (only shown for 410*a*), TX rate processors and selector 430 (only shown for 410*a*), TX optics 422 (only shown for 410*a*), an optical output 424*a-c*, and a switch output 421*a-c*. The TX mapper function 411 performs substantially the same functions as the TX mapper IC 211, and may be implemented with one or more ICs. The TX input processor and distribution function 414 performs substantially the same functions as the TX input processor and distribution IC 214, and may be implemented with one or more ICs. The TX rate processors and selector function 430 performs substantially the same functions as the N TX rate processor ICs 216*a-b* and the 1-for-n selector IC 218, and may be implemented with one or more ICs. The TX optics 422 performs the electrical to optical conversion. The electrical switch 415 provides the ability to configurably send data received from 414 to either the TX rate processor and selector 430 or the switch output port 421*a*.

The at least one fixed-rate optical transceiver (TX) 456 comprises an electrical input 455, electronics 457, TX optics 458, and an optical output 424*d*. An electronic data stream received at input 455 is forwarded to the electronics 457 wherein any required formatting or other processing is performed. The electronics 457 then forwards the processed data stream to the TX optics 458, which convert the electrical signal to an optical signal prior to sending it out its output optical port 424*d*.

Operation of the TX portion of the apparatus 400 is as follows. The rate-adaptive optical transceiver (TX) 410*a* receives a set of input data streams from its group of input data ports 412*a*. The TX mapper function maps the input data streams to the appropriate transport units and then combines them into one aggregate input bit stream 423. The aggregate input bit stream may be physically transferred over a single physical transmission entity (such as a single differential electrical pair of signals), or it may be physically transferred over a plurality of physical transmission entities 423, as indicated in FIG. 4. The TX mapper 411 forwards the aggregate input bit stream to the TX input processor 414, wherein some preparation for the rate processors may be performed, prior to forwarding to the switch 415. When the aggregate input bit stream 423 is forwarded on a first optical path, the switch may forward the entire aggregate input bit stream to the TX rate processors and selector 430. The TX rate processors and selector 430 formats the aggregate input bit stream 423 prior to outputting it to the TX optics 422 using a first transmittable bit rate. The TX optics 422 converts the received electrical signal to an optical signal with a unique wavelength (frequency) prior to forwarding the signal out of the transceiver's output port 424*a*. The output port 424*a* is optically connected to input port 431*a* on the optical mux 430. The optical mux 430 is capable of optically multiplexing wavelengths on all of its inputs 431*a-d* into a single wavelength division multiplexed (WDM) signal, after which it outputs this signal on the output port of the transceiver 426. The optical signal leaving the transceiver my then be routed from the apparatus (the first apparatus) to a second "apparatus for performing path protection for rate-adaptive optics" via an optical network connecting the first apparatus to the second apparatus.

The first optical path may be such that the optical transceiver is able to operate at its highest bit rate, thus allowing the entire aggregate input bit stream to be transported to the second apparatus using a single wavelength. If a fault occurs on the first optic optical path, the aggregate input bit stream may need to be routed through the network on a second optical path. However, conditions associated with the second optical path may be such that the rate-adaptive optical transceiver can no longer transmit the entire aggregate input bit stream to the second apparatus at the same bit rate without causing bit errors. For this case, the rate-adaptive optical transceiver (TX) reduces its output bit rate to a second transmittable bit rate in order to achieve substantially error-free transmission. Once it reduces its output bit rate, the rate-adaptive optical transceiver can no longer transmit the entire aggregate input bit stream 423, and therefore it may now divide the bit stream into a first portion and a second portion. This is performed by the switch function 415. The switch function forwards the first portion of the aggregate input bit stream 423 to the TX rate processors and selector block 430 for transmission out of the rate-adaptive optical transceiver at output 424a, and forwards the second portion to its switch output port 421a. The switch output port is electrically connected to the 1-of-k selector 450 via electrical line 425a. When the fault occurs on the first optical path, the 1-of-k selector 450 is configured to forward the electrical signal received on its input 452a to its output 454. Since the input 455 to the fixed-rate optical transceiver 456 is connected to the output 454 of the 1-of-k selector 450, the second portion of the aggregate input bit stream is forwarded to the fixed-rate transceiver. The fixed-rate optical transceiver 456 converts the second portion of the aggregate input bit stream to an optical signal while assigning it to a second wavelength (frequency). The fixed rate optical transceiver transmits the second portion of the aggregate input bit stream using a third transmittable bit rate. The second wavelength is multiplexed along with the first wavelength from the rate-adaptive optical transceiver by the optical mux 430. The output bit rate of the fixed-rate optical transceiver is such that it is able to transmit the second portion of the aggregate input bit stream on the second optical path to the second apparatus without error.

The apparatus provides a means of transmitting the aggregate input bit stream out of the apparatus by providing a combined electrical and optical path from the set of input ports 412a to the output port 426. The wavelength (frequency) assigned to the optical signal exiting the rate-adaptive transceiver is used to guide the wavelength from the first apparatus to the second apparatus by way of the optical network that resides between the two apparatuses. Each apparatus resides within an optical node of the optical network, and there may be one or more additional optical nodes between the nodes holding the two apparatuses. Prior to a fault on the first optical path, configuring the rate-adaptive optical transceiver to transmit the aggregate input bit stream out of the apparatus using a particular wavelength, provides an optical identifier for the optical signal as it makes its way from the first apparatus to the second apparatus. Each node between the two apparatuses is configured to route the received wavelength along the first optical path by using the frequency of the wavelength as an optical identifier. Therefore, once each network node between the two apparatuses is configured correctly, by configuring the optical frequency (wavelength) of the optical signal exiting the rate-adaptive transmitter to a particular optical frequency (wavelength), the apparatus is providing a means to output the wavelength on the first optical path.

When the fault (failure) occurs on the first optical path, the optical signal carrying the aggregate input bit stream must be "routed" around the fault (failure). In order to do this the optical nodes between the two apparatuses may need to be reconfigured in order to direct the wavelength carrying the aggregate input bit stream around the fault (failure). Additionally, the wavelength (frequency) used by the optical signal carrying the aggregate input bit stream may need to be changed by the rate-adaptive optical transceiver 410a. After the fault occurs, the network is additionally configured to route the optical wavelength used by the fixed-rate optical transceiver through the optical network from the first apparatus to the second apparatus. The optical wavelength (frequency) used by the fixed-rate optical transceiver may also configurable, so by configuring the wavelength to a particular value, the apparatus provides a means of transmitting the wavelength of the fix-rate optical transceiver on the second optical path. By controlling the optical wavelength used by the optical signals carrying the aggregate input bit stream, the apparatus provides a means of transmitting the aggregate input bit stream on the first optical path and on the second optical path.

In summary, FIG. 4 shows an apparatus comprising a group of one or more input ports 412a with an aggregate input bit stream 423, a rate-adaptive optical transceiver 410a having a first transmittable bit rate and at least a second transmittable bit rate, at least one fixed-rate optical transceiver 456 having a third transmittable bit rate, and a means of transmitting the aggregate input bit stream out of the apparatus on a first optical path and on at least a second optical path, wherein when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used.

The aggregate input bit stream is transmitted on the first optical path as long as there is no fault on the first optical path. For this case, only the rate-adaptive optical transceiver is used to transmit the aggregate input bit stream. As a result of a fault on the first optical path, the aggregate input bit stream is transmitted on at least a second optical path. For this case, both the rate-adaptive optical transceiver and the fixed-rate optical transceiver are used to transmit the aggregate input bit stream.

For the fault scenario, the optical wavelength generated by the fixed-rate optical transceiver does not necessarily have to take the same optical path as the wavelength generated by the rate-adaptive optical transceiver. It may instead be transmitted on a third optical path. Therefore, at a minimum a second optical path may be used, and at a maximum, both a second and third optical path may be used. In either case, "at least" a second optical path will be used.

As an optical signal passes through an optical network, the signal will accumulate noise. This is due to optical amplifiers within the network. The result is that the signal's optical-to-signal-noise-ratio (OSNR) decreases as it passes through an optical network. At some point, the noise will become large enough such that the signal can no longer be transported through the network substantially error free. This point is often regarded as the OSNR threshold. The difference between the OSNR of a signal and its OSNR threshold is often referred to as the signal's OSNR margin. The larger the OSNR margin is for a given optical signal, the more unlikely it is for the signal to incur bit errors. When the rate-adaptive optical transceiver transmits the entire aggregate input bit stream on the first optical path using a first transmittable bit rate, it may likely be configured to transmit at the lowest possible bit rate for that optical path, as the lowest possible bit rate will typically provide the largest OSNR margin. When the rate-adaptive optical transceiver transmits on the second optical path, the rate-adaptive optical transceiver may be capable of transmitting the entire aggregate input bit stream on the second optical path without errors while still using the first transmittable bit rate. For this case, the fixed-rate optical transceiver is not necessary. However, if the second path is such that the rate-adaptive optical transceiver cannot transmit the entire aggregate input bit stream on the second optical path without errors, using the first transmittable bit rate, it may need to use a second transmittable bit rate, wherein the second transmittable bit rate is less than the first transmittable bit rate. For this case, the rate-adaptive optical transceiver may likely only table to transmit a first portion of the aggregate input bit stream, and the fixed-rate optical transceiver would be needed to transmit the second portion of the aggregate input bit stream.

There may be several reasons why the rate may need to change when transitioning to a new optical path. For instance, the first optical path may be shorter than the at least second optical path. Or, the second optical path may be noisier than the first optical path. Or, the second optical path may have a greater amount of chromatic dispersion (CD) than the first optical path. Or, the second optical path may have a greater amount of polarization mode dispersion (PMD) than the first optical path. Or, second optical path may use a different type of fiber than the first optical path. Or, the second optical path may have some combination of all of the previous reasons.

For a network built with similar fiber, and using similar optical equipment throughout, the most common reason for having to lower the transmittable bit rate may be because the second optical path is longer than the first optical path. A longer distance path typically requires additional optical amplification, leading directly to a lower OSNR.

The simplest rate-adaptive optical transceiver is one that has only two configurable transmittable rates. In one embodiment of a rate-adaptive optical transceiver with two configurable transmittable rates, the first transmittable bit rate is at least equal to twice the second transmittable bit rate. For example, the first transmittable bit rate may utilize a PAM-4 modulation method at 10 Giga-symbols per second (20 Gbps), while the second transmittable bit rate may utilize a PAM-2 modulation method at 10 Giga-symbols per second (10 Gbps). For this example, the first transmittable bit rate is equal to twice the second transmittable bit rate.

The fixed-rate optical transceiver may have a third transmittable bit rate. The third transmittable bit rate will likely be less than the highest transmittable bit rate of the rate-adaptive optical transceiver. The third transmittable bit rate may be less than the highest transmittable bit rate of the rate-adaptive optical transceiver, but greater than the lowest transmittable bit rate of the rate-adaptive optical transceiver. The third transmittable bit rate may be equal to one of the transmittable bit rates of the rate-adaptive optical transceiver. The third transmittable bit rate may be equal to the lowest transmittable bit rate of the rate-adaptive optical transceiver. The third transmittable bit rate may be lower than the lowest transmittable bit rate of the rate-adaptive optical transceiver.

Given that a given signal format may have a higher percentage of overhead bytes than another signal format, instead of comparing raw bit rates (as was done previously), one may compare "payload" bit rates. It's important to consider payload bit rates because some transmission formats are more efficient than others. For instance, for a rate-adaptive optical transceiver with two transmittable bit rates, its first transmittable bit rate may be three times its second transmittable bit rate, but the transmittable payload bit rate of its first transmittable bit rate may only be twice the transmittable payload bit rate of its second transmittable bit rate. Since a given optical transceiver's main purpose is to transport payloads, a transceiver's payload transmittable bit rate is all that really matters. Therefore, the invention can be described in terms of payload transmittable bit rates. With that said, FIG. 4 shows an apparatus comprising: a group of one or more input ports 412a with an aggregate input bit stream 423, a rate-adaptive optical transceiver 410a having a first payload transmittable bit rate and at least a second payload transmittable bit rate, at least one fixed-rate optical transceiver 456 having a third payload transmittable bit rate, and a means of transmitting the aggregate input bit stream out of the apparatus on a first optical path and on at least a second optical path, wherein when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used.

When the rate-adaptive optical transceiver transmits the entire aggregate input bit stream on the first optical path using a first transmittable payload bit rate, it may likely be configured to transmit at the lowest possible transmittable payload bit rate for the first optical path, as the lowest possible transmittable payload bit rate will typically provide the largest OSNR margin. When the rate-adaptive optical transceiver transmits on the second optical path, the rate-adaptive optical transceiver may be capable of transmitting the entire aggregate input bit stream on the second optical path without errors while still using the first transmittable payload bit rate. For this case, the fixed-rate optical transceiver is not necessary. However, if the second path is such that the rate-adaptive optical transceiver cannot transmit the entire aggregate input bit stream on the second optical path without errors, using the first transmittable payload bit rate, it may need to use a second transmittable payload bit rate, wherein the second transmittable payload bit rate is less than the first transmittable payload bit rate. For this case, the rate-adaptive optical transceiver may likely only table to transmit a first portion of the aggregate input bit stream, and the fixed-rate optical transceiver would be needed to transmit the second portion of the aggregate input bit stream.

For a network built with similar fiber, and using similar optical equipment throughout, the most common reason for having to lower the transmittable payload bit rate may be because the second optical path is longer than the first optical path. A longer distance path typically requires additional optical amplification, leading directly to a lower OSNR.

The simplest rate-adaptive optical transceiver is one that has only two configurable transmittable payload bit rates. In one embodiment of a rate-adaptive optical transceiver with two configurable transmittable payload bit rates, the first transmittable payload bit rate is at least equal to twice the second transmittable payload bit rate.

The fixed-rate optical transceiver may have a third transmittable payload bit rate. The third transmittable payload bit rate will likely be less than the highest transmittable payload bit rate of the rate-adaptive optical transceiver. The third transmittable payload bit rate may be less than the highest transmittable payload bit rate of the rate-adaptive optical transceiver, but greater than the lowest transmittable payload bit rate of the rate-adaptive optical transceiver. The third transmittable payload bit rate may be equal to one of the transmittable payload bit rates of the rate-adaptive optical transceiver. The third transmittable payload bit rate may be equal to the lowest transmittable payload bit rate of the rate-adaptive optical transceiver. The third transmittable payload bit rate may be lower than the lowest transmittable payload bit rate of the rate-adaptive optical transceiver.

In one embodiment, the rate-adaptive optical transceiver may have two configurable transmittable payload bits rates. Additionally, the first transmittable payload bit rate of the rate-adaptive optical transceiver may be twice the rate of its second transmittable payload bit rate. Additionally, the transmittable payload bit rate of the fixed-rate optical transceiver may be equal to the second transmittable payload bit rate of the rate-adaptive optical transceiver. For this embodiment, when the apparatus is transmitting the aggregate input bit stream on the second optical path, the rate-adaptive optical transceiver may transport half the payload of the aggregate input bit stream, and the fixed-rate optical transceiver may transport half the payload of the aggregate input bit stream.

In another embodiment, the rate-adaptive optical transceiver may have four configurable transmittable payload bits rates. Additionally, the second transmittable payload bit rate of the rate-adaptive optical transceiver may be three-quarters (0.75) the rate of its first transmittable payload bit rate. Additionally, the third transmittable payload bit rate of the rate-adaptive optical transceiver may be half (0.5) the rate of its first transmittable payload bit rate. Additionally, the fourth transmittable payload bit rate of the rate-adaptive optical transceiver may be one-quarter (0.25) the rate of its first transmittable payload bit rate. Additionally, the transmittable payload bit rate of the fixed-rate optical transceiver may be equal to the fourth transmittable payload bit rate of the rate-adaptive optical transceiver. For this embodiment, when the apparatus is transmitting the aggregate input bit stream on the second optical path, the rate-adaptive optical transceiver may transport ¾ the payload of the aggregate input bit stream, and the fixed-rate optical transceiver may transport ¼ the payload of the aggregate input bit stream.

In one network scenario, the rate-adaptive optical transceiver may transport the entire aggregate input bit stream over a first optical path (using a first transmittable bit rate), but may require more than one fixed-rate optical transceiver to transport the aggregate input bit stream over a second optical path. For instance, in order to transport the aggregate input stream over the second optical path, it may require the rate-adaptive optical transceiver (operating at a second transmittable bit rate) and two fixed-rate optical transceivers (each operating at a third transmittable bit rate). Furthermore, all three optical signals (from the three optical transceivers) may be routed on different optical paths (such as a second optical path, a third optical path, and a fourth optical path). In general, the apparatus may comprise of a group of one or more input ports with an aggregate input bit stream, a rate-adaptive optical transceiver having a first transmittable bit rate and at least a second transmittable bit rate, at least one fixed-rate optical transceiver having a third transmittable bit rate, and a means of transmitting the aggregate input bit stream out of the apparatus on a first optical path and on at least a second optical path, wherein when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used. The apparatus, further comprises a plurality of additional fixed-rate optical transceivers, wherein when transmitting the aggregate input bit stream on the at least second optical path, one or more of the plurality of additional fixed-rate optical transceivers are additionally used.

A single fixed-rate optical transceiver may be used to protect a plurality of rate-adaptive optical transceivers. This is especially relevant if each of the rate-adaptive transceivers is transporting an optical signal on different optical paths. FIG. 4 shows the case where one fixed-rate optical transceiver is used to protect the optical signals of k rate-adaptive optical transceivers. When one of the rate-adaptive optical transceivers 410a-c needs to switch to a new optical path that requires the use of the fixed-optical transceiver 456, the 1-of-k selector 450 is configured to select and forward the signal from that rate-adaptive optical transceiver's switch port 421a-c.

In another embodiment, s number of fixed-rate optical receivers may be used to protect the optical signals of k number of rate-adaptive optical transceivers (not shown). In such an embodiment, the group of s fixed-rate optical transceivers is shared amongst the group of k rate-adaptive optical transceivers in an s-for-k protection scheme. In this scheme, one or more fixed-rate optical transceivers may be used to protect the optical signals of a given rate-adaptive optical transceiver. In order to implement the s-for-k protection scheme, the 1-of-k selector 450 would be replaced with an s-for-k selector.

In yet another embodiment, a combination of both fixed-rate adaptive optical transceivers and rate-adaptive optical transceivers may be used to protect a group of rate-adaptive optical transceivers. When transitioning to a new optical path, a second rate-adaptive optical transceiver may be used in combination with the first rate-adaptive transceiver for cases where additional bandwidth beyond the bandwidth of a single rate-adaptive optical transceiver and a single fixed-rate optical transceiver is required.

Figure 5:
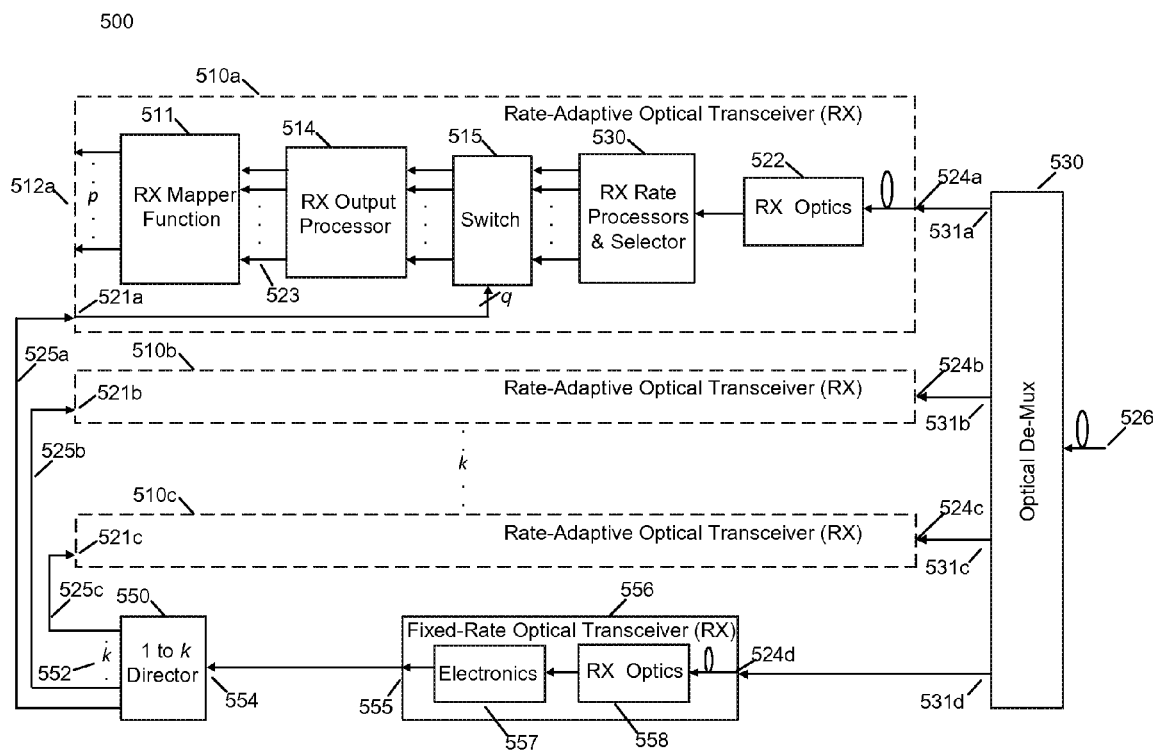
FIG. 5 is a first embodiment of the receiver portion of an apparatus for performing path protection for rate-adaptive optics.

FIG. 5 illustrates the receiver (RX) portion of an apparatus for performing path protection for rate-adaptive optics 500 that would be used in conjunction with the transmitter portion of an apparatus for performing path protection for rate-adaptive optics 400. The receiver (RX) portion of an apparatus for performing path protection for rate-adaptive optics 500 comprises an optical demultiplexer 530 with a single network (NW) input optical port 526 and a plurality of output optical ports 531a-d, k number of rate-adaptive optical transceivers 510a-c each having a single optical input port 524a-c and an electrical switch input port 521a-c and a group of p output ports 512a (shown only on rate-adaptive optical transceiver 510a), a fixed-rate optical transceiver 556 with a single optical input port 524d and a single electrical output port 555, and a 1-to-k director 550.

Each rate-adaptive optical transceiver 510a-c further comprises RX optics 522, a plurality of RX rate processors with a selector 530, an electrical switch 515, an RX output processor 514, an RX mapper function 511, and group of p output ports 512a (shown only on rate-adaptive optical transceiver 510a). The fixed-rate optical transceiver 556 further comprises RX optics 558 and electronics 557.

The receiver portion of the apparatus for performing path protection for rate-adaptive optics 500 performs the reverse functions of the transmitter portion of the apparatus for performing path protection for rate-adaptive optics 400, and its functional blocks perform functions that are substantially the same as those functions described in reference to 230 of FIG. 2. In FIG. 5, a wavelength division multiplexed (WDM) optical signal is received at the apparatus input 526, and is forwarded to the optical demultiplexer 530. The optical demultiplexer demultiplexes the WDM signal into its individual constituent wavelengths, and forwards each wavelength out of its output ports 531a-d to the input ports 524a-d of the k rate-adaptive optical transceivers 510a-c and the fixed-rate adaptive transceiver 556. Each rate-adaptive optical transceiver 510a-c first converts its inputted optical signal to an electrical signal using its RX optics 522, and then forwards the electrical signal to its rate adaptive processors 530. The rate adaptive processor corresponding the rate and format of the received signal is used to further process the received electrical signal. The electrical signal is then passed onto the switch 515 using one or more physical transport links. The switch is used to combine the physical transport links from the RX rate processors 530 with one or more physical transport links from the switch input port 521a, and forward the combined links to the RX output processor 514. In a non-protection mode, only physical transport links from the RX rate processors 530 are forwarded to the RX output processor 514. After performing any needed processing on the signals inputted to it, the RX output processor 514 forwards the resulting composite signal to the RX mapper function 511. The RX mapper function 511 is used to map a composite signal onto the group of p output ports 512a. The RX mapper function 511 may also be used to perform additional functions such as forward error correction and performance monitoring.

The transmitter portion of the apparatus 400 would reside at the start of an optical path, while the receiver portion of the apparatus 500 would reside at the end of an optical path. For example, the transmitter portion of a first apparatus may be used to transmit a bit stream to the receiver portion of a second apparatus, wherein the first apparatus may be located in a first optical node within an optical network, and the second apparatus may be located in a second optical node within the optical network. When receiving an optical wavelength containing the entire aggregate input bit stream 423 of a rate-adaptive optical transceiver transmitter 410a, the optical demultiplexer 530 forwards the wavelength to a single rate-adaptive optical transceiver (RX) 510a. This would be the case when the optical signal follows a first optical path through an optical network. For this case, the switch port 521a on the rate-adaptive optical transceiver 510a goes unused.

When there is a fault on the first optical path, such that the transmitter portion of the apparatus 400 forwards the aggregate input bit stream 423 through the network using a second optical path using both a rate-adaptive optical transceiver (TX) 410a (transporting a first portion of the aggregate input bit stream 423) and at least one fixed rate optical transceiver 456 (transporting the second portion of the aggregate input bit stream 423), the receiver portion of the apparatus 500 will receive two wavelengths carrying the aggregate input bit stream 423. The optical multiplexer 530 will forward one wavelength to a rate-adaptive transceiver 510a (containing a first portion of the aggregate input bit stream 423), and one wavelength to a fixed-rate transceiver 556 (containing the second portion of the aggregate input bit stream 423). Both the rate-adaptive transceiver 510a, and the fixed-rate transceiver 556 will convert their respective received wavelengths to electrical format and properly demodulate their respective signals. The fixed-rate optical transceiver will forward its second portion of the aggregate input bit stream 423 to the 1-to-k director 550, which will be configured to forward this signal to the rate-adaptive optical transceiver 510a operating on the first portion of the aggregate input bit stream 423. The rate-adaptive optical receiver 510a will receive the second portion of the aggregate input bit stream from the 1-to-k director 550 via its switch input port 521a, and it will combine the second portion of the aggregate input bit stream with its first portion of the aggregate input bit stream using its switch 515. The recombined signal will be further processed by the RX output processor and RX mapper function prior to be forwarded to the group of p output ports 512a.

The embodiments of the transmitter portion of the apparatus for performing path protection for rate-adaptive optics that were previously described apply to the receiver portion of the apparatus for performing path protection for rate-adaptive optics. For example, embodiments may include: rate-adaptive optics supporting two or four rates/formats, embodiments with more than one fixed-rate optical transceivers, embodiments wherein the payload bit rates are considered, and embodiments wherein both fixed-rate and rate-adaptive optical transceivers are used when a second optical path is used due to a fault within the optical network.

Figure 6A:
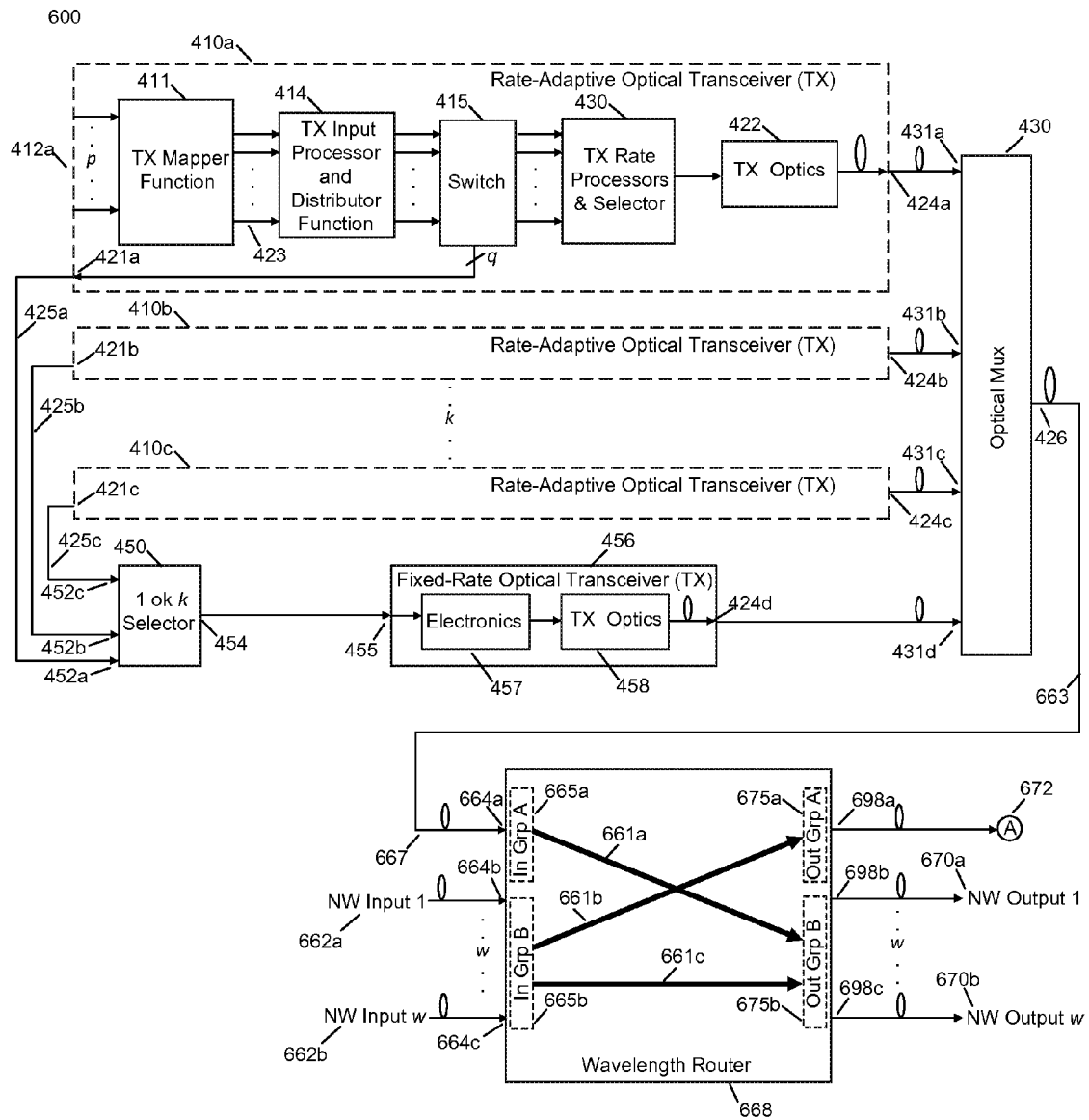
FIG. 6A is a second embodiment of an apparatus for performing path protection for rate-adaptive optics.
Figure 6B:
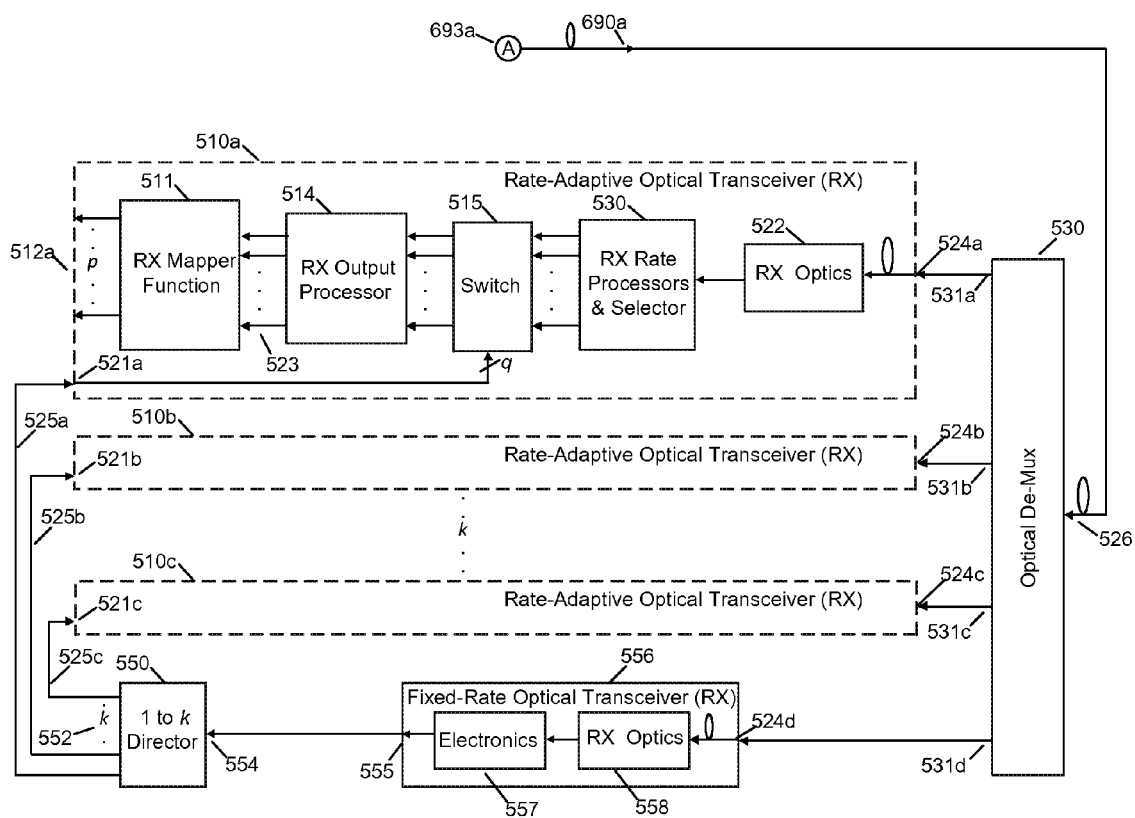
FIG. 6B is the continuation of the second embodiment of an apparatus for performing path protection for rate-adaptive optics.

Previously described were fault scenarios wherein the first and second optical paths began 426 and ended 526 on the same optical fiber of the apparatus. In this case, an apparatus comprising of 400 and 500 could be utilized. A second type of apparatus is one that contains multiple network fiber interfaces. Such an apparatus allows the first and second optical paths to begin and end on separate optical fibers. FIG. 6A and FIG. 6B depicts an embodiment 600 of one such apparatus for performing path protection for rate-adaptive optics.

The apparatus 600 contains a transmitter portion (shown in FIG. 6A), a network interface portion (shown in FIG. 6A), and a receiver portion (shown in FIG. 6B). The transmitter portion comprises a group of input ports 412a, one or more rate-adaptive optical transceivers 410a-c (which are substantially the same as the rate-adaptive optical transceivers described in reference to FIG. 4), at least one fixed-rate optical transceiver 456 (which is substantially the same as the fixed-rate optical transceiver described in reference to FIG. 4), a 1-of-k selector 450 (which is substantially the same as the selector described in reference to FIG. 4), an optical multiplexer 430 (which is substantially the same as the multiplexer described in reference to FIG. 4), and an optical output 426.

The network interface portion of the apparatus 600 comprises a wavelength router 668, w−1 network input ports 662a-b, a transmit input port 667, a receive output port 672, and w−1 network output ports 670a-b. The wavelength router contains w WDM optical inputs 664a-c and w optical outputs 698a-c. Each input port 664a-c and output port 698a-c of the wavelength router carries an optical wavelength division multiplexed signal having one or more wavelengths. The wavelength router 668 provides the ability to route wavelengths from the inputs of the router 664a-c to the outputs of the router 698a-c. A w by w (or M×N, wherein w=M=N) wavelength selective switch (WSS) could perform this function in an example embodiment. It can be noted, however, that full connectivity between every input port and every output port is not required. As shown in FIG. 6A, the input and output ports of the wavelength router can be segregated into groups: "In Group A" 665a, "In Group B" 665b, "Out Group A" 675a, and "Out Group B" 675b. The thick arrows 661a-c then indicate the connectivity required between the input and output ports of the router. Specifically, wavelengths are required to be routed from the inputs of "In Group A" 665a to the outputs of "Out Group B" 675b, but are not required to be routed from the inputs of "In Group A" 665a to the outputs of "Out Group A" 675a. However, in general, wavelengths are required to be routed from "In Group B" 665*b* to the outputs "Out Group A" 675*a* and to the outputs of "Out Group B" 675*b*, with the exception that wavelengths from given NW Input i are not required to be routed to the corresponding given NW Output i. Therefore, as an example, for a network interface portion containing three network inputs and three network outputs (w=3), NW Input 1 662*a* would be required to route wavelengths to NW Output 2 (not shown) and to NW Output 3 (not shown), but not to NW Output 1 670*a*.

The receiver portion of the apparatus 600 comprises an optical demultiplexer 530 (which is substantially the same as the demultiplexer 530 of FIG. 5), one or more rate-adaptive optical transceivers 510*a-c* (which are substantially the same as the rate-adaptive optical transceivers described in reference to FIG. 5), at least one fixed-rate optical transceiver 556 (which is substantially the same as the fixed-rate optical transceiver described in reference to FIG. 5), a 1-to-k selector 550 (which is substantially the same as the selector described in reference to FIG. 5), an input from the network interface portion 693*a*, an optical fiber or other optical medium 690*a* connecting the receiver portion of 600 to the network interface portion, and a set of p output ports 512*a*.

The wavelength routing function 688 shown in FIG. 6A has w optical inputs 664*a-c* and w optical outputs 698*a-c*. Each optical input and output signal is a wavelength division multiplexed signal containing one or more optical wavelengths. The wavelength routing function 688 can be configured to route wavelengths from its w input ports to its w output ports.

Figure 7:
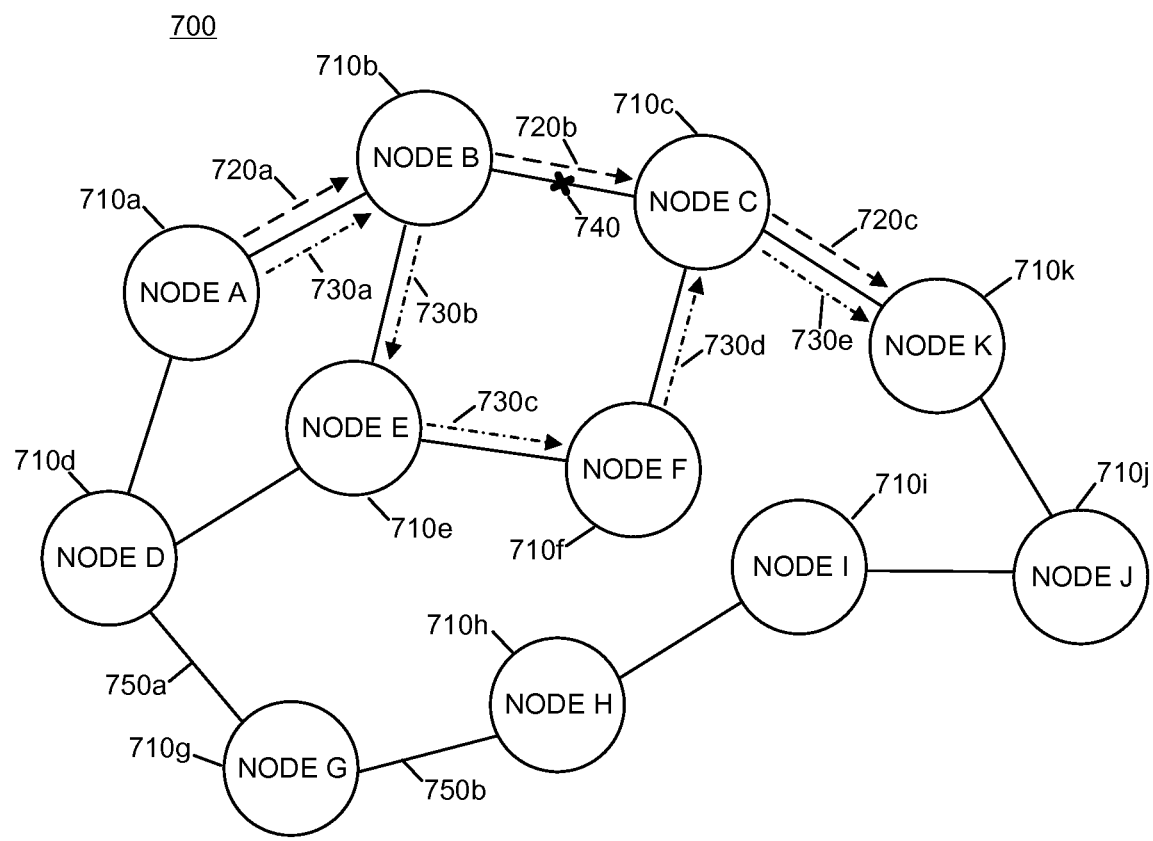
FIG. 7 is a network diagram of a first type of network failure.
Figure 8:
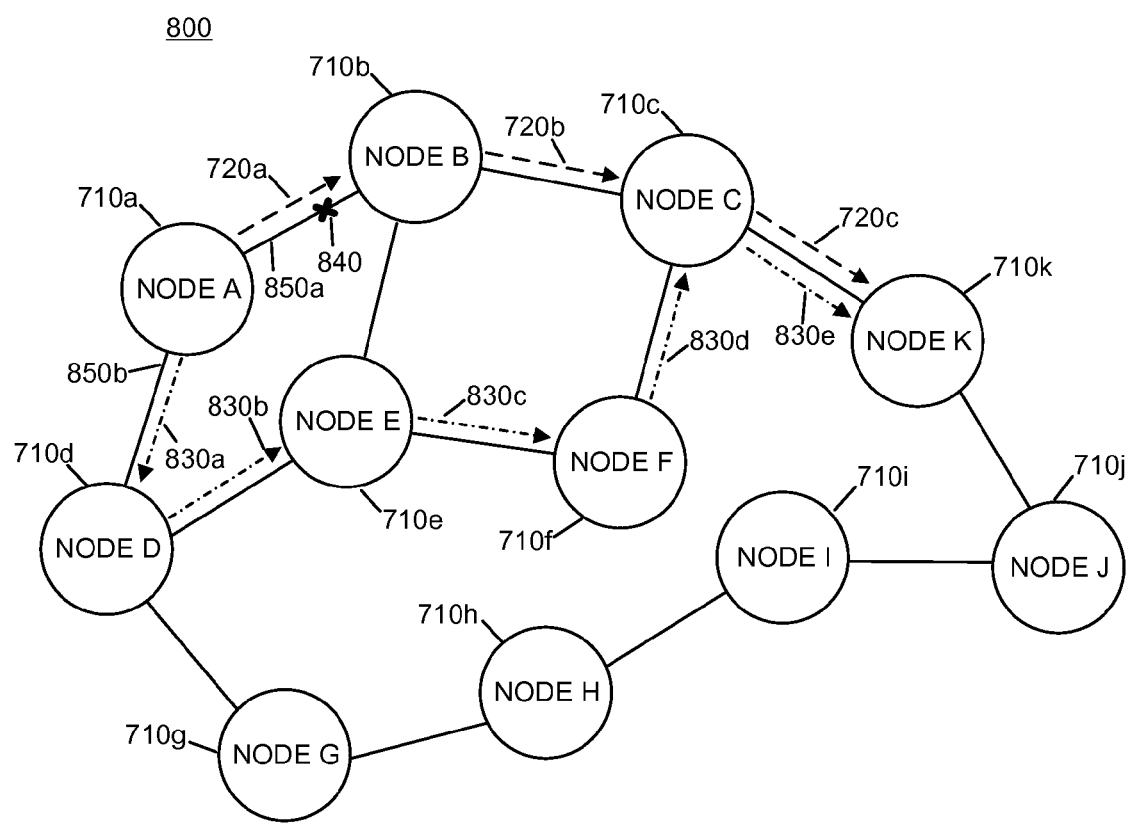
FIG. 8 is a network diagram of a second type of network failure.
Figure 9:
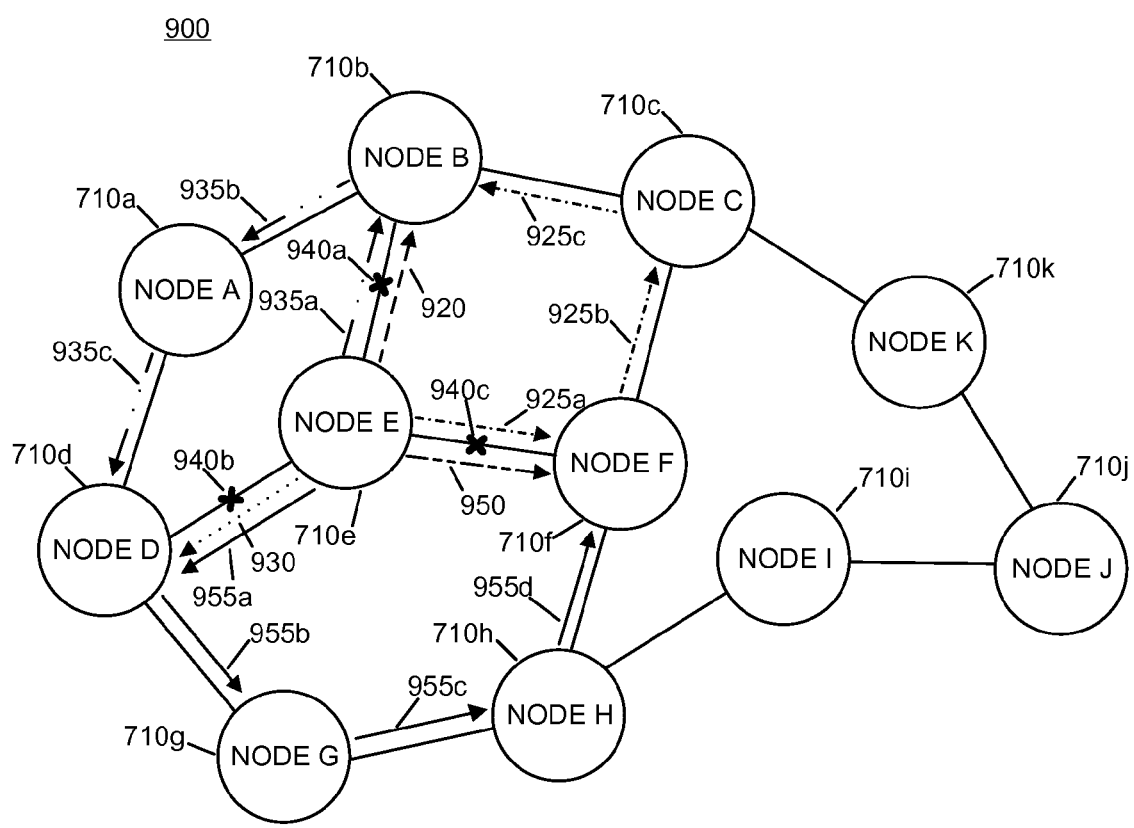
FIG. 9 is a network diagram of a third type of network failure.

The apparatus 600 may be deployed within an optical node of an optical network, wherein the network inputs 662*a-b* and network outputs 670*a-b* of each apparatus 600 is interconnected to the network inputs 662*a-b* and network outputs 670*a-b* of other apparatuses 600 using fiber optic cables. Examples of such networks are shown in FIG. 7, FIG. 8, and FIG. 9, wherein each node may contain at least one apparatus 600. In such a deployment, a wavelength arriving at a network input 662*a-b* of a node 710*a-j* may be routed to a network output 670*a-b*, or may be routed to one of the optical transceivers within the receiver portion of the apparatus. For example, the WDM optical signal arriving at NW Input 1 662*a* may be forwarded to the receiver portion 693*a* and to all NW Outputs other than NW Output 1. Alternatively, the routing function 668 within the network interface portion of the apparatus may be configured to either forward a given wavelength it receives on one of its inputs 664*a-c* to one or more outputs 698*a-c*, or it may be configured to not forward a given wavelength it receives on one of its inputs to one or more outputs 698*a-c* (and instead block it from reaching some or all outputs).

The transmitter portion of the apparatus 600 behaves substantially similar to the transmitter 400, other than the fact that the output 426 of the optical multiplexer in apparatus 600 is forwarded to input 664*a* of wavelength router 668 via an optical fiber or other optical medium 663. Similarly, the receiver portion of the apparatus 600 behaves substantially similar to the receiver 500, other than the fact that its input to its optical demultiplexer is connected to output 698*a* of the wavelength routing function 688 via an optical fiber or other optical medium 690*a*.

The network diagrams 700, 800, and 900 shown in FIG. 7, FIG. 8, and FIG. 9 will be used to further illustrate the operation of apparatus 600.

FIG. 7 shows a network diagram 700 consisting of eleven optical nodes 710*a-k*. Each optical node 710*a-k* is interconnected to two or more other optical nodes via fiber optical cables—represented by the solid lines beginning at one node and ending at another node in FIG. 7. For example, node G 710*g* is interconnected to node D 710*d* via optical cable 750*a*, and is additionally interconnected to node H 710*h* via optical cable 750*b*. Each connection between two adjacent optical nodes will be referred to as a link segment, and for simplicity, all the lengths of each link segment (and all the optical characteristics of each link segment) in the networks 700, 800, and 900 are identical. Each network node 710*a-k* may contain an apparatus 600.

FIG. 7 illustrates the network fault scenario wherein the first and second optical paths begin on the same optical fiber. For this case, a first (transmitter) apparatus 600 is located within optical node A, and a second (receiver) apparatus 600 is located within optical node K. The first optical path 720*a-c* begins at node A, traverses through optical nodes B and C, and ends at node K, as illustrated by the dashed line segments 720*a-c* in FIG. 7. The apparatus 600 within node A launches a wavelength carrying an aggregate input signal along the first optical path 720*a-c*. At some point a fault 740 occurs on the fiber between nodes B 710*b* and C 710*c*. In order to route around the fault 740, the apparatus 600 within node A performs any necessary adjustments in order to steer the wavelength carrying the aggregate input signal to the second optical path 730*a-e*. In one fault recovery scenario, the apparatus within node A utilizes the same wavelength (frequency) when following the second optical path, but the rate-adaptive optical transceiver is unable transmit the additional distance of the second optical path, as the second optical path is longer than the first optical path by two link segments. Therefore, adjustments must be made within the apparatuses at nodes A 710*a*, B 710*b*, C, 710*c*, E 710*e*, F 710*f*, and K 710*k*. First, at the apparatus 600 within node A, by appropriately reconfiguring the switch 415 and the 1-of-k selector 450, a first portion of the aggregate input bit stream 423 may be directed to the TX Rate Processors & Selector 430, and a second portion of the aggregate input bit stream 423 may be redirected to the fixed-rate optical transceiver 456. Within the TX Rate Processors & Selector block 430, a lower bit rate is chosen for the rate-adaptive optical transceiver. Additionally, the wavelength (frequency) from the rate-adaptive optical transceiver 410*a* may need to be changed in order to avoid a wavelength conflict on the second optical path. The fixed-rate optical transceiver utilizes a wavelength that differs from that used by the rate-adaptive optical transceiver. The wavelength used by the rate-adaptive optical transceiver when using the first optical path may be referred to as a first wavelength (and its corresponding frequency—a first frequency), while the wavelength used by the rate-adaptive optical transceiver when using the second optical path may be referred to as a second wavelength (and its corresponding frequency—a second frequency), wherein often the first wavelength is equal to the second wavelength. Additionally, the wavelength used by the fixed-rate optical transceiver may be referred to as a third wavelength (and its corresponding frequency—a third frequency), wherein the third wavelength (for optical paths beginning on the same fiber) is always different than the second wavelength. The optical mux 430 optically multiplexes the second and third wavelengths together and forwards the resulting WDM signal to the wavelength router 668. Since the first optical path and the second optical path begin on the same optical fiber (the optical fiber connecting node A and node B), there is no need to reconfigure the wavelength router 668 within the apparatus 600 of node A 710*a*. Therefore, if for example, NW Output 1 connected to the optical fiber connecting node A and node B, then the first and second wavelengths would be routed from input 664*a* to output 698*b* on the wavelength router 668.

Continuing on with the network reconfiguration occurring as a result of the fault 740, the apparatus 600 within node B 710*b* is configured to reroute the second and third wavelengths (from node A) from the first optical path 720*a-c* to the second optical path 730*a-e* (using its wavelength router 668 contained within the apparatus 600 within node B). The apparatuses 600 within node E 710*e* and within node F 710*f* are configured to route the second and third wavelengths along the second optical path 730*a-e*. The apparatus 600 within node C 710*c* is configured to route the second and third wavelengths from node F 710*f* to node K 710*k*, and to not route the first wavelength from node B 710*b*. Since the second and third wavelengths arrive on the same optical fiber as the first wavelength, the apparatus 600 within node K 710*k* does not need to have its wavelength router reconfigured. The apparatus 600 within node K 710*k* first de-multiplexes the second and third wavelengths using its optical de-mux 530, and then forwards the second wavelength to the rate-adaptive optical transceiver 510*a*, and forwards the third wavelength to the fixed rate optical transceiver 556. The rate-adaptive optical transceiver 510*a* operates on the first portion of the aggregate input stream signal 423, and the fixed-rate optical transceiver 556 operates on the second portion of the aggregate input stream signal 423. The rate-adaptive optical transceiver 510*a* converts the second optical wavelength to electrical format and demodulates it, and then forwards the first portion of the aggregate input bit stream 423 to the electrical switch 515. The fixed-rate optical transceiver 556 converts the third optical wavelength to electrical format and demodulates it, after which it forwards the second portion of the aggregate input bit stream 423 to the 1-to-k director 550. The 1-to-k director 550 is configured to forward the signal from the fixed-rate optical transceiver to the switch 515 of the rate-adaptive optical transceiver 510*a* that is operating on the second optical wavelength. The switch 515 within 510*a* combines the first portion of the aggregate input bit stream with the second portion of the aggregate input bit stream in order to form the aggregate output bit stream 523, which is then forwarded to the output ports 512*a*.

If the second wavelength is equal to the first wavelength, then a colored optical de-multiplexer may be used for de-mux 530. If the second wavelength is different from the first wavelength, then a colorless optical de-multiplexer may be used for de-mux 530. A colored optical de-multiplexer operates such that a given physical output is coupled to a specific wavelength, whereas with a colorless optical de-multiplexer a given physical output may be used for any wavelength within a range of wavelengths. An example of a colored optical de-multiplexer is an arrayed waveguide grating (AWG), while an example of a colorless optical de-multiplexer is a 1-to-w optical coupler followed by an array of w optical tunable filters.

FIG. 8 depicts the scenario wherein the first optical path 720*a-c* begins on a first optical fiber 850*a*, and the second optical path 830*a-e* begins on a second optical fiber 850*b*. FIG. 8 shows a network diagram 800 consisting of eleven optical nodes 710*a-k*. Each optical node 710*a-k* is interconnected to two or more other optical nodes via fiber optical cables—represented by the solid lines beginning at one node and ending at another node in FIG. 8. In 800, each fiber connection between two adjacent optical nodes will be referred to as a link segment, and for simplicity, all the lengths of each link segment (and all the optical characteristics of each link segment) in the network 800 are identical. Each network node 710*a-k* may contain an apparatus 600.

FIG. 8 illustrates the network fault scenario wherein the first and second optical paths begin on two different optical fibers (fibers 850*a* and 850*b*). For this case, a first (transmitter) apparatus 600 is located within optical node A 710*a*, and a second (receiver) apparatus 600 is located within optical node K 710*k*. The first optical path 720*a-c* begins at node A 710*a*, traverses through optical nodes B 710*b* and C 710*c*, and ends at node K 710*k*, as illustrated by the dashed line segments 720*a-c* in FIG. 7. The apparatus 600 within node A 710*a* launches a wavelength carrying an aggregate input signal along the first optical path 720*a-c*. At some point a fault 840 occurs on the fiber between nodes A 710*a* and B 710*b*. In order to route around the fault 840, the apparatus 600 within node A 710*a* performs the necessary adjustments in order to steer the wavelength carrying the aggregate input signal to the second optical path 830*a-e*. In one fault recovery scenario, the apparatus within node A utilizes the same wavelength (frequency) when following the second optical path, but the rate-adaptive optical transceiver is unable transmit the additional distance of the second optical path, as the second optical path is longer than the first optical path by two link segments. Therefore, adjustments must be made within the apparatuses at nodes A 710*a*, D 710*d*, E 710*e*, F 710*f*, C 710*c*, and K 710*k*. First, at the apparatus 600 within node A, by appropriately reconfiguring the switch 415 (within 410*a*) and the 1-of-k selector 450, a first portion of the aggregate input bit stream 423 may be directed to the TX Rate Processors & Selector 430 (within 410*a*), and a second portion of the aggregate input bit stream 423 may be redirected to the fixed-rate optical transceiver 456. Within the TX Rate Processors & Selector block 430 (within 410*a*), a lower bit rate is chosen for the rate-adaptive optical transceiver 410*a*. Additionally, the optical wavelength from the rate-adaptive optical transceiver may need to be changed in order to avoid a wavelength conflict on the second optical path. The fixed-rate optical transceiver utilizes a wavelength that differs from that used by the rate-adaptive optical transceiver. The wavelength used by the rate-adaptive optical transceiver when using the first optical path may be referred to as a first wavelength (and its corresponding frequency—a first frequency), while the wavelength used by the rate-adaptive optical transceiver when using the second optical path may be referred to as a second wavelength (and its corresponding frequency—a second frequency), wherein often the first wavelength is equal to the second wavelength. Additionally, the wavelength used by the fixed-rate optical transceiver may be referred to as a third wavelength (and its corresponding frequency—a third frequency), wherein the third wavelength is always different than the second wavelength. The optical mux 430 optically multiplexes the second and third wavelengths together and forwards the resulting WDM signal to the wavelength router 668. Since the first optical path and the second optical path begin on different optical fibers (the optical fiber connecting node A and node B 850*a*, and the optical fiber connecting node A to node D 850*b*), there is a need to reconfigure the wavelength router 668 within the apparatus 600 of node A 710*a*. For example, if NW Output 1 670*a* is connected to the optical fiber connecting node A and node B 850*a*, and if NW Output w 670*b* is connected to the optical fiber connecting node A and node D 850*b*, then the first wavelength would be routed from input 664*a* to output 698*b* within the wavelength router, and the second and third wavelengths would be routed from input 664*a* to output 698*c* within the wavelength router.

Continuing on with the network reconfiguration occurring as a result of the fault 840, the apparatuses 600 within node D 710*d*, node E 710*e*, and node F 710*f* are configured to route the second and third wavelengths along the second optical path 830*a-e*. The apparatus 600 within node C 710*c* is configured to route the second and third wavelengths from node F 710*f* to node K 710*k*, and to not route the first wavelength from node B 710*b*. Since the second and third wavelengths arrive on the same optical fiber as the first wavelength, the apparatus 600 within node K 710*k* does not need to have its wavelength router reconfigured. The apparatus 600 within node K 710*k* first de-multiplexes the second and third wavelengths using the optical de-mux 530, and then forwards the second wavelength to the rate-adaptive optical transceiver 510*a*, and forwards the third wavelength to the fixed-rate optical transceiver 556. The rate-adaptive optical transceiver 510*a* operates on the first portion of the aggregate input stream signal 423, and the fixed-rate optical transceiver 556 operates on the second portion of the aggregate input stream signal 423. The rate-adaptive optical transceiver 510*a* converts the second optical wavelength to electrical format and demodulates it, after which it is forwarded to the switch 415. The fixed-rate optical transceiver 556 converts the third optical wavelength to electrical format and demodulates it, after which it is forwarded to the 1-to-k director 550. The 1-to-k director 550 is configured to forward the signal from the fixed-rate optical transceiver to the switch 515 of the rate-adaptive optical transceiver 510*a* that is operating on the second optical wavelength. The switch 515 within 510*a* combines the first portion of the aggregate input bit stream with the second portion of the aggregate input bit stream in order to form the aggregate output bit stream 523, which is then forwarded to the output ports 512*a*.

If the second and third wavelengths arrived at Node K 710*k* via a different optical fiber—from node J 710*j* for example—then the wavelength router 668 within node K 710*j* would need to be reconfigured. For instance, assume that the first optical path arrived at node K 710*k* on NW Input 1 662*a*, and that the second optical path arrived at node K 710*k* on NW Input w 662*b*. Then, before the fault 840, the wavelength router 668 within the apparatus 600 of node K 701*k* would be configured to route the first wavelength from input 664*b* of the wavelength router 668 to output 698*a* of the router 668, while after the fault 840, the wavelength router 668 within the apparatus 600 of node K 710*k* would be configured to route the second and third wavelengths from input 664*c* of the wavelength router 668 to output 698*a* of the router 668.

Another network example that can be examined is depicted in FIG. 9. FIG. 9 shows a network diagram 900 consisting of eleven optical nodes 710*a-k*. Each optical node 710*a-k* is interconnected to two or more other optical nodes via fiber optical cables—represented by the solid lines beginning at one node and ending at another node in FIG. 9. Each connection between two adjacent optical nodes will be referred to as a link segment, and for simplicity, all the lengths of each link segment (and all the optical characteristics of each link segment) in the network 900 are identical. Each network node 710*a-k* may contain an apparatus 600.

The network 900 is used to illustrate the concept of fixed-rate optical transceiver protection sharing. In 900, prior to any network faults, three optical paths are established using three different rate-adaptive optical transceivers within the apparatus 600 within node E 710*e*. More specifically, a first optical path 920 using a first wavelength and a first rate-adaptive optical transceiver 410*a* is established between node E 710*e* and node B 710*b*, and a second optical path 930 using a second wavelength and a second rate-adaptive optical transceiver 410*b* is established between node E 710*e* and node D 710*d*, and a third optical path 950 using a third wavelength and a third rate-adaptive optical transceiver 410*c* is established between node E 710*e* and node F 710*f*. The first 410*a*, second 410*b*, and third 410*c* rate-adaptive optical transceivers within optical node E 710*e* are protected by a single fixed-rate optical transceiver 456 within the apparatus 600 within node E 710*e*. This assumes that there is only a single fiber fault in the network 900 at any given point in time. With respect to network 900, assume that a given rate-adaptive transceiver is only able to transport the entire input aggregate bit rate when the distance is only two or fewer optical links.

Assume now that a fault 940*a* occurs on the fiber between Node E 710*e* and Node B 710 that affects the first wavelength generated by the first rate-adaptive optical transceiver 410*a*. For this fault case, at node E 710*e*, the data within the first wavelength now will be redirected such that it follows the fourth optical path 925*a-c*. In order to do this, the apparatus 600 within node E 710*e* performs the necessary adjustments in order to steer the wavelength carrying the aggregate input signal to the second optical path 925*a-c*. First, at 410*a* within the apparatus 600 within node E 710*e*, by appropriately reconfiguring the switch 415 and the 1-of-k selector 450, a first portion of the aggregate input bit stream 423 may be directed to the TX Rate Processors & Selector 430, and a second portion of the aggregate input bit stream 423 may be redirected to the fixed-rate optical transceiver 456. For this fault (940*a*), the 1-of-k selector 450 is configured to forward the electrical signal at input 452*a* of the selector to output 454 of the selector. The wavelength used by the first rate-adaptive optical transceiver when using the fourth optical path may be referred to as the fourth wavelength, while the wavelength used by the fixed-rate optical transceiver may be referred to as the fifth wavelength. The optical mux 430 optically multiplexes the fourth and fifth wavelengths together and forwards the resulting WDM signal to the wavelength router 668. Since the first optical path and the fourth optical path begin on different optical fibers (the optical fiber connecting node E and node B, and the optical fiber connecting node E 710*e* to node F 710*f*), there is a need to reconfigure the wavelength router 668 within the apparatus 600 of node E 710*e*. For example, if NW Output 1 670*a* connected to the optical fiber connecting node E 710*e* and node B 710*b*, and if NW Output w 670*b* connected to the optical fiber connecting node E 710*e* and node F 710*f*, then the first wavelength would be routed from input 664*a* to output 698*b* within the wavelength router, and the fourth and fifth wavelengths would be routed from input 664*a* to output 698*c* within the wavelength router.

Assume now that prior to any other faults, a fault 940*b* occurs on the fiber between Node E 710*e* and Node D 710*d* that affects the second wavelength generated by the second rate-adaptive optical transceiver 410*b*. For this case, at node E 710*e*, the data within the second wavelength now will now be redirected to follow the fifth optical path 935*a-c*. In order to do this, the apparatus 600 within node E 710*e* performs the necessary adjustments in order to steer the wavelength carrying the aggregate input signal to the fifth optical path 935*a-c*. First, at 410*b* within the apparatus 600 within node E 710*e*, by appropriately reconfiguring the switch and the 1-of-k selector within 410*b*, a first portion of the aggregate input bit stream of 410*b* may be directed to the TX Rate Processors & Selector of 410*b*, and a second portion of the aggregate input bit stream may be redirected to the fixed-rate optical transceiver 456. For this fault (940*b*), the 1-of-k selector 450 is configured to forward the electrical signal at input 452*b* of the selector to output 454 of the selector. The wavelength used by the second rate-adaptive optical transceiver 410*b* when using the fifth optical path may be referred to as the sixth wavelength, while the wavelength used by the fixed-rate optical transceiver 456 may be referred to as the fifth wavelength. The optical mux 430 optically multiplexes the sixth and fifth wavelengths together and forwards the resulting WDM signal to the wavelength router 668. Since the second optical path and the fifth optical path begin on different optical fibers (the optical fiber connecting node E 710*e* and node D 710*d*, and the optical fiber connecting node E 710*e* to node B 710*b*), there is a need to reconfigure the wavelength router 668 within the apparatus 600 of node E 710*e*. For example, if NW Output 1 670*a* is connected to the optical fiber connecting node E 710*e* and node D 710*d*, and if NW Output w 670*b* is connected to the optical fiber connecting node E 710*e* and node B 710*b*, then the second wavelength would be routed from input 664*a* to output 698*b* on the wavelength router 668, and the sixth and fifth wavelengths would be routed from input 664*a* to output 698*c* on the wavelength router 668.

Assume now that prior to any other faults, a fault 940*c* occurs on the fiber between Node E 710*e* and Node F 710*f* that affects the third wavelength generated by the third rate-adaptive optical transceiver 410*c*. For this case, at node E 710*e*, the data within the third wavelength now will be redirected to follow the sixth optical path 955*a*-*d*. In order to do this, the apparatus 600 within node E 710*e* performs the necessary adjustments in order to steer the wavelength carrying the aggregate input signal to the sixth optical path 955*a*-*d*. First, at 410*c* within the apparatus 600 within node E 710*e*, by appropriately reconfiguring the switch and the 1-of-k selector within 410*c*, a first portion of the aggregate input bit stream of 410*c* may be directed to the TX Rate Processors & Selector of 410*c*, and a second portion of the aggregate input bit stream may be redirected to the fixed-rate optical transceiver 456. For this fault (940*c*), the 1-of-k selector 450 is configured to forward the electrical signal at input 452*c* of the selector to output 454 of the selector. The wavelength used by the third rate-adaptive optical transceiver when using the sixth optical path may be referred to as the seventh wavelength, while the wavelength used by the fixed-rate optical transceiver may be referred to as the fifth wavelength. The optical mux 430 optically multiplexes the seventh and fifth wavelengths together and forwards the resulting WDM signal to the wavelength router 668. Since the third optical path and the sixth optical path begin on different optical fibers (the optical fiber connecting node E 710*e* and node F 710*f*, and the optical fiber connecting node E 710*e* to node D 710*d*), there is a need to reconfigure the wavelength router 668 within the apparatus 600 of node E 710*e*. For example, if NW Output 1 670*a* is connected to the optical fiber connecting node E 710*e* and node F 710*f*, and if NW Output w 670*b* connected to the optical fiber connecting node E 710*e* and node D 710*d*, then the third wavelength would be routed from input 664*a* to output 698*b* within the wavelength router 668, and the seventh and fifth wavelengths would be routed from input 664*a* to output 698*c* within the wavelength router 668.

Assuming that the optical paths in the network 900 are bidirectional paths, the receiver portion of the apparatus 600 may protect the receive portions of the three rate-adaptive optical transceivers 510*a*-*c*. This is accomplished by the apparatus 600 in node E710*e* in the following manner. When the two wavelengths arrive at the wavelength router 668, the router 668 is configured to route both wavelengths (the one from the rate-adaptive optical transceiver, and one from the fixed-rate optical transceiver within the apparatus 600 within the far-end node) to the optical de-multiplexer 526 within the apparatus 600 within node E 710*e*. Based upon the two wavelengths used by the far-end node, the optical de-multiplexer 526 forwards one wavelength to the appropriate rate-adaptive optical transceiver 510*a*-*c* and one wavelength to the fixed-rate optical transceiver 556. As long as there is only one fault associated with the three optical paths associated with the three rate-adaptive optical transceivers, the single fixed-rate optical transceiver 556—in combination with other circuitry within apparatus 600—may protect all three optical paths in the receive direction. In one embodiment the fixed-rate optical transceiver uses a specific wavelength regardless of which rate-adaptive optical transceiver path is being protected. For this case, a colored optical de-multiplexer 530 can be utilized with the apparatus 600. In another embodiment the fixed-rate optical transceiver may use any available wavelength. For this case, at least the drop port 531*d* to the fixed-rate optical transceiver must be colorless. In another embodiment, the drop ports 531*a*-*c* to the rate-adaptive optical transceivers may colored drop ports, while the drop port to the fixed-rate optical transceiver may be colorless.

From the above three fault scenarios 940*a*-*c* it can be seen that one fixed-rate optical transceiver in combination with the other circuitry within apparatus 600 can protect up to w rate-adaptive optical transceivers under a single network fault scenario, assuming that each rate-adaptive optical transceiver is operating on a separate network optical fiber. Additional fixed-rate optical transceivers may be deployed within the apparatus 600 in order to provide coverage for two or more simultaneous faults within the network. Such a protection scheme would provide s number of fix-rate protection transceivers for every k number of rate-adaptive optical transceivers (s for k protection).

From the diagrams 600, 700, 800, and 900—and the associated discussion for these diagrams—an apparatus, comprising: a group of one or more input ports with an aggregate input bit stream, a rate-adaptive optical transceiver having a first transmittable bit rate and at least a second transmittable bit rate, at least one fixed-rate optical transceiver having a third transmittable bit rate, and a means of transmitting the aggregate input bit stream out of the apparatus on a first optical path and on at least a second optical path may be constructed. The apparatus is such that when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used. The apparatus may further comprise of a first output port connected to a first optical fiber, and a second output port connected to a second optical fiber, wherein the first optical path begins on the first optical fiber and the at least second optical path begins on the second optical fiber. The apparatus may further comprise of a means for moving the rate-adaptive optical transceiver from the first output port to the second output port.

The means of transmitting the aggregate input bit stream out of the apparatus on a first optical path and on at least a second optical path is provided by the rate-adaptive optical transceiver 410*a* with an internal switch 415 (and a corresponding switch port 421*a*), a 1-of-k selector 450, at least one fixed-rate optical transceiver 456, and optical multiplexer 430, and a wavelength router 668.

The means of means for moving the rate-adaptive optical transceiver from the first output port (port 698*b*, for example) to the second output port (port 698*c*, for example) is provided by the wavelength router 668.

There may be instances wherein the rate-adaptive optical transceiver and a single fixed-rate optical transceiver are unable to transport the entire aggregate input bit stream on certain optical paths. For these cases, the apparatus 600 may further comprise of a plurality of additional fixed-rate optical transceivers, wherein when transmitting the aggregate input bit stream on the at least second optical path, one or more of the plurality of additional fixed-rate optical transceivers are additionally used. For example, suppose that a rate-adaptive optical transceiver transports a 30 Gbps bit stream on a first optical path, and it is only able to transport a 10 Gbps bit stream on a second optical path. Also suppose a given fixed-rate optical transceiver is only able to transport 10 Gbps on the second optical path. Then when transporting the 30 Gbps on the second optical path, the rate-adaptive optical transceiver and two fixed-rate optical transceivers are required. In order to enable this embodiment, the 1-of-k selector 450 and the 1-to-k director 550 should be replaced with k-by-s and s-by-k electrical switches respectively. For the k-by-s switch that replaces 450, each input 452*a-c* of the switch would be connected to a switch output port 421*a-c* on one of the k rate-adaptive optical transceivers 410*a-c* within the apparatus 600, and each output of the switch would be connected to one of the s fixed-rate optical transceivers 456 within the apparatus 600. For the s-by-k switch that replaces 550, each output 552 of the switch would be connected to a switch input port 521*a-c* on one of the k rate-adaptive optical transceivers 510*a-c* within the apparatus 600, and each input 554 of the switch would be connected to one of the s fixed-rate optical transceivers 556 within the apparatus 600. In general, a single bidirectional k-by-s electrical switch may be used in place of the k-by-s and s-by-k electrical switches. Alternatively, a single n-by-n bidirectional electrical switch may bee used in place of the k-by-s and s-by-k electrical switches, wherein n is equal to the higher number of either the rate-adaptive optical transceivers or fixed-rate optical transceivers within the apparatus 600. When using the single n-by-n bidirectional electrical switch, some number of inputs and outputs on the switch may likely not be used.

With respect to the network fault scenario described in regard to network 900, an apparatus can be described that has the ability to share a fixed-rate optical transceiver between at least two rate-adaptive optical transceivers. The apparatus, comprises a first group of one or more input ports with an aggregate input bit stream, a first rate-adaptive optical transceiver having a first transmittable bit rate and at least a second transmittable bit rate, at least one fixed-rate optical transceiver having a third transmittable bit rate, and a means of transmitting the aggregate input bit stream out of the apparatus on a first optical path and on at least a second optical path. The apparatus is such that when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used. The apparatus further comprises a second group of one or more input ports having a second aggregate input bit stream, a second rate-adaptive optical transceiver having the first transmittable bit rate and at least the second transmittable bit rate, and a means of transmitting the second aggregate input bit stream out of the apparatus on a third optical path and on at least a fourth optical path, wherein when transmitting the second aggregate input bit stream on the third optical path, the second rate-adaptive optical transceiver is used, and wherein when transmitting the second aggregate input bit stream on the at least fourth optical path, the second rate-adaptive optical transceiver and the at least one fixed-rate optical transceiver are used. The apparatus 600 further comprises a first output port connected to a first optical fiber; and a second output port connected to a second optical fiber, wherein the first optical path begins on the first optical fiber, and the third optical path begins on the second optical fiber.

In addition to its transmitter functionally, the apparatus 600 may also be described in terms of its receiver functionally. The apparatus 600, comprises one or more optical input ports 662*a-b* used to input an aggregate bit stream, a rate-adaptive optical transceiver 510*a* that receives at a first receivable bit rate and at least a second receivable bit rate, at least one fixed-rate optical transceiver 556 that receives at a third receivable bit rate, and a means of receiving the aggregate bit stream from a first optical path and from at least a second optical path. When the apparatus 600 is receiving the aggregate bit stream from the first optical path, the rate-adaptive optical transceiver is used, and when the apparatus 600 is receiving the aggregate bit stream from the at least second optical path, the rate-adaptive optical transceiver and the at least one fixed-rate optical transceiver are used. The aggregate bit stream may be received from the at least second optical path as a result of a fault on the first optical path.

When receiving the aggregate bit stream from the first optical path, the rate-adaptive optical transceiver 510*a* receives the aggregate bit stream at the first receivable bit rate, and when receiving the aggregate bit stream from the second optical path, the rate-adaptive optical transceiver receives the aggregate bit stream at the second receivable bit rate.

In one network scenario, the first optical path may be shorter that the at least second optical path. In such a scenario, the rate-adaptive optical transceiver may be unable to transport the entire aggregate bit stream over the second optical path, thereby requiring the assistance of the fixed-rate optical transceiver when the second optical path is used for transmission.

In one embodiment of the apparatus 600, the first receivable bit rate is greater than the second receivable bit rate. In another embodiment of the apparatus, the first receivable bit rate is at least equal to twice the second receivable bit rate. In another embodiment of the apparatus 600, the second receivable bit rate is about equal to the third receivable bit rate.

An optical fiber may be connected to one of the one or more optical input ports 662*a-b*, and the first optical path and the at least second optical path may terminate (end) on the optical fiber. Alternatively, the one or more optical input ports 662*a-b* may include a first optical input port connected to a first optical fiber, and a second optical input port connected to a second optical fiber. For this configuration, the first optical path may terminate (end) on the first optical fiber and the at least second optical path may terminate (end) on the second optical fiber. The apparatus 600 may further comprise a means of moving the rate-adaptive optical transceiver from the first optical fiber to the second optical fiber. This means may be in the form of a wavelength router 668.

The apparatus 600 may further comprise a plurality of additional fixed-rate optical transceivers, wherein when receiving the aggregate bit stream on the at least second optical path, one or more of the plurality of additional fixed-rate optical transceivers may additionally be used.

The apparatus 600 may additionally comprise a second rate-adaptive optical transceiver 510*b* having the first receivable bit rate and at least the second receivable bit rate, and a means of receiving a second aggregate bit stream from a third optical path and from at least a fourth optical path, wherein when receiving the second aggregate bit stream from the third optical path, the second rate-adaptive optical transceiver 510*b* is used, and wherein when receiving the second aggregate bit stream from the at least fourth optical path, the second rate-adaptive optical transceiver 510*b* and the at least one fixed-rate optical transceiver 556 are used. It can be noted that since the fixed-rate optical transceiver 556 is used with both the rate-adaptive optical transceiver 510*a* and the second rate-adaptive optical transceiver 510*b*, in order to protect against all single fiber faults with an optical network, the first optical path and the third optical path should not share any fiber links. Therefore, the one or more optical input ports may include a first optical input port connected to a first optical fiber, and a second optical input port connected to a second optical fiber, wherein the first optical path terminates on the first optical fiber, and the third optical path terminates on the second optical fiber.

Based upon the previous descriptions, a method for preforming path protection may be defined. The method comprises first receiving an aggregate input bit stream at the transmitting apparatus 600 (such as 423 shown in FIG. 6A), and then transmitting the aggregate input bit stream using a rate-adaptive optical transceiver (such as 410*a* in FIG. 6A) when transmitting on a first optical path (such as 720*a-c* in FIG. 7), and transmitting the aggregate input bit stream using the rate-adaptive optical transceiver (such as 410*a* in FIG. 6A) and a fixed-rate optical transceiver (such as 456 in FIG. 6A) when transmitting on a second optical path (such as 730*a-e* in FIG. 7) following a fault (such as 740 in FIG. 7) on the first optical path. When transmitting the aggregate input bit stream on the first optical path, the rate-adaptive optical transceiver may transmit using a first transmittable bit rate, and when transmitting the aggregate input bit stream on the second optical path, the rate-adaptive optical transceiver may transmit using a second transmittable bit rate, wherein the first transmittable bit rate may be greater than the second transmittable bit rate. Furthermore, the transmittable bit rate of the fixed-rate optical transceiver may be equal to the second transmittable bit rate of the rate-adaptive optical transceiver. Additionally, the first transmittable bit rate may be at least equal to twice the second transmittable bit rate. Also, according to the method, the first optical path may be shorter than the at least second optical path. Additionally, the first optical path and the second optical path may begin on a first optical fiber (such as the optical paths 720*a* and 730*a* shown in FIG. 7). Alternatively, the first optical path may begin on a first optical fiber and the second optical path may begin on a second optical fiber (such as optical paths 720*a-c* and 830*a-e* shown in FIG. 8).

The method also comprises moving the rate-adaptive optical transceiver from the first optical fiber to the second optical fiber after the fault on the first optical path. Such a scenario is depicted in FIG. 8 involving the fault 840. When fault 840 occurs, the wavelength router 668 within apparatus 600 is reconfigured in order to forward the aggregate input bit stream from a first network output 670*a* to a second network output 670*b*.

The method additionally comprises utilizing one or more additional fixed-rate optical transceivers when transporting the aggregate input bit stream on the second optical path. One or more additional fixed-rate optical transceivers may be used when the rate-adaptive optical transceiver and a single fixed-rate optical transceiver do not have enough bandwidth to transport the aggregate input bit stream on the second optical path.

The method further comprises receiving a second aggregate input bit stream, transmitting the second aggregate input bit stream using a second rate-adaptive optical transceiver when transmitting on a third optical path, and transmitting the second aggregate input bit stream using the second rate-adaptive optical transceiver and the fixed-rate optical transceiver when transmitting on a fourth optical path following a fault on the third optical path. For this case, the first optical path may begin on a first optical fiber and the third optical path may begin on a second optical fiber, since one fixed-rate optical transceiver is used to protect the first optical path of two rate-adaptive optical transceivers, as depicted in reference to the network scenarios shown in FIG. 9.

At the receiving apparatus 600, the method comprises first receiving an aggregate bit stream. This may be the aggregate input bit stream 423 so described with reference to the transmitting apparatus. The aggregate bit stream may be received from a single optical fiber (such as a fiber connected to NW Input 1 662*a*, for example), or it may be received from more than one optical fiber (such as fibers connected to NW Input 1 662*a* and NW Input w 662*b*, for example). The aggregate bit stream may be received from a single optical wavelength, or from a plurality of optical wavelengths. The method further comprises forwarding the aggregate bit stream using a rate-adaptive optical transceiver (like 510*a*) when receiving from a first optical path, and forwarding the aggregate bit stream using the rate-adaptive optical transceiver and a fixed-rate optical transceiver (like 556) when receiving from a second optical path following a fault on the first optical path. Two possible optical paths between two apparatuses within two optical nodes are illustrated in FIG. 7 (720*a-c* and 730*a-e*), wherein a transmitting apparatus 600 may be located in node A 710*a*, and wherein a receiving apparatus 600 may be located in node K 710*k*. For the network fault scenario shown in FIG. 7, the aggregate bit stream is received from a single fiber both before and after the fault 740. Before the fault 740, the aggregate bit stream is received from the first optical path 720*a-c* using a single optical wavelength. After the fault 740, the aggregate bit stream is received from the first second path 730*a-e* using two optical wavelengths (one for the rate-adaptive optical transceiver, and one for the fixed-rate optical transceiver). When receiving the aggregate bit stream from the first optical path, the rate-adaptive optical transceiver may receive at a first receivable bit rate, and when receiving the aggregate bit stream from the second optical path, the rate-adaptive optical transceiver may receive at a second receivable bit rate, wherein the first receivable bit rate may be greater than the second receivable bit rate. Additionally, when receiving the aggregate bit stream from the second optical path, the receivable bit rate of the fixed-rate optical transceiver may be equal to the second receivable bit rate of the rate-adaptive optical transceiver. Alternatively, when receiving the aggregate bit stream from the first optical path, the rate-adaptive optical transceiver may receive at a first receivable bit rate, and when receiving the aggregate bit stream from the second optical path, the rate-adaptive optical transceiver may receive at a second receivable bit rate, wherein the first receivable bit rate may be at least equal to twice the second receivable bit rate. Furthermore, when receiving the aggregate bit stream from the first and second optical paths, the first optical path may be shorter than the second optical path.

Additionally, when receiving the aggregate bit stream, the first optical path and the second optical path may terminate (end) on a first optical fiber at the receiver apparatus 600 (as illustrated in FIG. 7). Alternatively, when receiving the aggregate bit stream, the first optical path may terminate (end) on a first optical fiber and the second optical path may terminate (end) on a second optical fiber. (This is illustrated by the two optical paths 920 and 925a-c in FIG. 9.). The method further comprises moving the rate-adaptive optical transceiver from the first optical fiber to the second optical fiber after the fault on the first optical path. (This was done by the wavelength router 668 within node B 710b following the fault 940a in FIG. 9. The wavelength router 668 routes a wavelength from the second optical path (from the second fiber) to the rate-adaptive optical transceiver 510a, thereby effectively moving the rate-adaptive optical transceiver 510a from the first fiber to the second fiber.)

The method further comprises using one or more of a plurality of additional fixed-rate optical transceivers when receiving the aggregate bit stream on the second optical path. This may be done when the rate-adaptive optical transceiver 510a and a single fixed-rate optical transceiver 556 are unable to provide enough bandwidth to receive the aggregate bit stream.

The method additionally comprises receiving a second aggregate bit stream, forwarding the second aggregate bit stream using a second rate-adaptive optical transceiver when receiving from a third optical path, and forwarding the second aggregate bit stream using the second rate-adaptive optical transceiver and the fixed-rate optical transceiver when receiving from a fourth optical path following a fault on the third optical path. When using the fixed-rate optical transceiver to protect the paths of both the first aggregate bit stream and the second aggregate bit stream, the paths may not share any common links (optical fibers). For this case, when receiving the aggregate bit stream from the first optical path, the first optical path terminates on a first optical fiber, and when receiving the second aggregate bit stream from the third optical path the third optical path terminates on a second optical fiber.

An optical node may include the entirety of apparatus 600. For this case, the optical node comprises a group of one or more input ports with an aggregate input bit stream, a rate-adaptive optical transceiver having a first transmittable bit rate and at least a second transmittable bit rate, at least one fixed-rate optical transceiver having a third transmittable bit rate, and a means of transmitting the aggregate input bit stream from the optical node on a first optical path and on at least a second optical path, wherein when transmitting the aggregate input bit stream on the first optical path, the rate-adaptive optical transceiver is used, and wherein when transmitting the aggregate input bit stream on the at least second optical path, the rate-adaptive optical transceiver and the at least one fixed-rate optical transceiver are used. The optical node may transmit the aggregate input bit stream on the at least second optical path as a result of a fault on the first optical path.

The optical node may transmit the aggregate input bit stream on the first optical path with the rate-adaptive optical transceiver using a first transmittable bit rate, and may transmit the aggregate input bit stream on the second optical path with the rate-adaptive optical transceiver using a second transmittable bit rate. Furthermore, the first transmittable bit rate may be greater than the second transmittable bit rate. Alternatively, the first transmittable bit rate is at least equal to twice the second transmittable bit rate. Also, the second transmittable bit rate may be about equal to the third transmittable bit rate.

The optical node may further comprise an output port connected to an optical fiber, wherein the first optical path and the at least second optical path begin on the optical fiber.

The optical node may further comprise a first output port connected to a first optical fiber, and a second output port connected to a second optical fiber, wherein the first optical path begins on the first optical fiber and the at least second optical path begins on the second optical fiber. Additionally, the optical node may further comprise a means for moving the rate-adaptive optical transceiver from the first output port to the second output port.

The optical node may further comprise a plurality of additional fixed-rate optical transceivers, wherein when transmitting the aggregate input bit stream on the at least second optical path, one or more of the plurality of additional fixed-rate optical transceivers are additionally used.

The optical node may additionally comprise a second group of one or more input ports having a second aggregate input bit stream, a second rate-adaptive optical transceiver having the first transmittable bit rate and at least the second transmittable bit rate, and a means of transmitting the second aggregate input bit stream out of the apparatus on a third optical path and on at least a fourth optical path, wherein when transmitting the second aggregate input bit stream on the third optical path, the second rate-adaptive optical transceiver is used, and wherein when transmitting the second aggregate input bit stream on the at least fourth optical path, the second rate-adaptive optical transceiver and the at least one fixed-rate optical transceiver are used.

The optical node may further comprise a first output port connected to a first optical fiber, and a second output port connected to a second optical fiber, wherein the first optical path begins on the first optical fiber, and the third optical path begins on the second optical fiber.

A plurality of network nodes containing the apparatus 600 may be interconnected to form an optical network. The optical network may comprise a first optical node and at least a second optical node, and there exists a first optical path and at least a second optical path connecting the first optical node and the at least second optical node. The first optical node may comprise a group of one or more input ports with an aggregate bit stream, a rate-adaptive optical transceiver having a first transmittable bit rate and at least a second transmittable bit rate, and at least one fixed-rate optical transceiver having a third transmittable bit rate.

The first optical node may transmit the aggregate bit stream to the at least second optical node over the first optical path using the rate-adaptive optical transceiver, and the first optical node may transmit the aggregate bit stream to the at least second optical node over the second optical path using the rate-adaptive optical transceiver and the at least one fixed rate optical transceiver. The first optical node may transmit the aggregate bit stream over the at least second optical path as a result of a fault on the first optical path.

When the aggregate bit stream is transmitted over the first optical path between the first optical node and the at least second optical node, the rate-adaptive optical transceiver may transmit with the first transmittable bit rate, and when transmitting the aggregate bit stream over the second optical path between the first optical node and the at least second optical node, the rate-adaptive optical transceiver may transmit with the second transmittable bit rate.

In one network, the first optical path is shorter than the at least second optical path.

The first transmittable bit rate of the first optical node within the optical network may be greater than the second transmittable bit rate. The first transmittable bit rate of the first optical node within the optical network may be at least equal to twice the second transmittable bit rate. The second transmittable bit rate of the first optical node within the optical network may be about equal to the third transmittable bit rate of the first optical node within the optical network.

The first optical node may further comprise an output port connected to an optical fiber, wherein the first optical path and the at least second optical path begin on the optical fiber. Alternatively, the first optical node may additionally comprise a first output port connected to a first optical fiber, and a second output port connected to a second optical fiber, wherein the first optical path begins on the first optical fiber and the at least second optical path begins on the second optical fiber. Additionally, the first optical node may comprise a means for moving the rate-adaptive optical transceiver from the first output port to the second output port.

The first optical node may further comprise additional fixed-rate optical transceivers, wherein when transmitting the aggregate bit stream over the at least second optical path, one or more of the plurality of additional fixed-rate optical transceivers may be additionally used.

The first optical node may further comprise a second group of one or more input ports having a second aggregate bit stream, a second rate-adaptive optical transceiver having the first transmittable bit rate and at least the second transmittable bit rate, and a means of transmitting the second aggregate bit stream from the first optical node over a third optical path and over at least a fourth optical path, wherein when transmitting the second aggregate bit stream over the third optical path, the second rate-adaptive optical transceiver is used, and wherein when transmitting the second aggregate bit stream over the at least fourth optical path, the second rate-adaptive optical transceiver and the at least one fixed-rate optical transceiver are used. The first optical node may additionally comprise of a first output port connected to a first optical fiber, and a second output port connected to a second optical fiber, wherein the first optical path begins on the first optical fiber, and the third optical path begins on the second optical fiber.

The second optical node in the optical network may further comprise a second rate-adaptive optical transceiver receiving at a first receivable bit rate and at least a second receivable bit rate, at least one additional fixed-rate optical transceiver receiving at a third receivable bit rate. When receiving the aggregate bit stream from the first optical path at the second optical node, the second rate-adaptive optical transceiver within the second optical node is used, and wherein when receiving the aggregate bit stream from the at least second optical path at the second optical node, the second rate-adaptive optical transceiver within the second optical node and the at least one additional fixed-rate optical transceiver within the second optical node are used. The aggregate bit stream may be received at the second optical node from the at least second optical path as a result of a fault on the first optical path. When receiving the aggregate bit stream from the first optical path, the second rate-adaptive optical transceiver within the second optical node receives at the first receivable bit rate, and wherein when receiving the aggregate bit stream from the second optical path, the second rate-adaptive optical transceiver within the second optical node receives at the second receivable bit rate. The first receivable bit rate at the second optical node may be greater than the second receivable bit rate. Additionally, the first receivable bit rate at the second optical node may be at least equal to twice the second receivable bit rate. Also, the second receivable bit rate at the second optical node may be about equal to the third receivable bit rate. Additionally, the first receivable bit rate is equal to the first transmittable bit rate, and the second receivable bit rate is equal to the second transmittable bit rate, and the third receivable bit rate is equal to the third transmittable bit rate.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. An apparatus, comprising:
   a rate-adaptive optical transceiver having a first receivable bit rate and at least a second receivable bit rate;
   at least one fixed-rate optical transceiver having a third receivable bit rate; and
   a means of receiving an aggregate bit stream from a first optical path and from at least a second optical path, wherein when receiving the aggregate bit stream from the first optical path, the rate-adaptive optical transceiver receiving with the first receivable bit rate is used, and wherein when receiving the aggregate bit stream from the at least a second optical path, the rate-adaptive optical transceiver receiving with the at least a second receivable bit rate and the at least one fixed-rate optical transceiver are used.

2. The apparatus of claim 1, wherein the aggregate bit stream is received from the at least a second optical path as a result of a fault on the first optical path.

3. The apparatus of claim 1, wherein the first optical path is shorter than the at least a second optical path.

4. The apparatus of claim 1, wherein the first receivable bit rate is greater than the at least a second receivable bit rate.

5. The apparatus of claim 1, wherein the first receivable bit rate is at least equal to twice the at least a second receivable bit rate.

6. The apparatus of claim 1, wherein the at least a second receivable bit rate is about equal to the third receivable bit rate.

7. The apparatus of claim 1, further comprising an optical fiber, wherein the first optical path and the at least a second optical path terminate on the optical fiber.

8. The apparatus of claim 1, further comprising a first optical fiber and a second optical fiber, wherein the first optical path terminates on the first optical fiber and the at least a second optical path terminates on the second optical fiber.

9. The apparatus of claim 8, further comprising a means for moving the rate-adaptive optical transceiver from the first optical fiber to the second optical fiber.

10. The apparatus of claim 1, further comprising a plurality of additional fixed-rate optical transceivers, wherein when receiving the aggregate bit stream from the at least a second optical path, one or more of the plurality of additional fixed-rate optical transceivers are additionally used.

11. The apparatus of claim 1, further comprising:
    a second rate-adaptive optical transceiver having the first receivable bit rate and the at least a second receivable bit rate; and a means of receiving a second aggregate bit stream from a third optical path and from at least a fourth optical path,
wherein when receiving the second aggregate bit stream from the third optical path, the second rate-adaptive optical transceiver is used, and wherein when receiving the second aggregate bit stream from the at least a fourth optical path, the second rate-adaptive optical transceiver and the at least one fixed-rate optical transceiver are used.

12. The apparatus of claim 11, further comprising a first optical fiber and a second optical fiber, wherein the first optical path terminates on the first optical fiber and the third optical path terminates on the second optical fiber.

13. An apparatus, comprising:
a group of one or more input ports having an aggregate input bit stream;
a rate-adaptive optical transceiver transmitting using a first wavelength and a second wavelength;
at least one fixed-rate optical transceiver transmitting using a third wavelength; and
a means of transmitting the aggregate input bit stream on a first optical path and on at least a second optical path,
wherein when transmitting the aggregate input bit stream on the first optical path, the aggregate input bit stream is transmitted by the rate-adaptive optical transceiver using the first wavelength, and wherein when transmitting the aggregate input bit stream on the second optical path, the aggregate input bit stream is transmitted by the rate-adaptive optical transceiver using the second wavelength and by the at least one fixed-rate optical transceiver.

14. The apparatus of claim 13, wherein when transmitting on the first optical path the rate-adaptive optical transceiver transmits using a first transmittable bit rate, and wherein when transmitting on the at least a second optical path the rate-adaptive optical transceiver transmits using a second transmittable bit rate, wherein the second transmittable bit rate is less than the first transmittable bit rate.

15. The apparatus of claim 13, wherein the first wavelength is equal to the second wavelength.

16. The apparatus of claim 13, wherein a wavelength router is the means of transmitting the aggregate input bit stream on the first optical path and on the at least a second optical path.

17. The apparatus of claim 13, wherein the third wavelength is multiplexed with the second wavelength.

18. A method for performing path protection, comprising:
receiving an aggregate input bit stream comprising of a first portion and a second portion;
transmitting the first portion and the second portion using a first optical transceiver when transmitting on a first optical path; and
transmitting the first portion on a second optical path using the first optical transceiver following a fault on the first optical path, and transmitting the second portion on a third optical path using a second optical transceiver following the fault on the first optical path,
wherein when transmitting the first portion and the second portion on the first optical path, the first optical transceiver transmits using a first transmittable bit rate, and wherein when transmitting the first portion and not the second portion on the second optical path, the first optical transceiver transmits using a second transmittable bit rate, wherein the first transmittable bit rate is greater than the second transmittable bit rate.

19. The method of claim 18, wherein the second optical path and the third optical path are the same optical path.

20. The method of claim 18, wherein the first optical transceiver is a rate-adaptive optical transceiver, and wherein the second optical transceiver is a fixed-rate optical transceiver.

21. The method of claim 18, further comprising:
receiving the first portion and the second portion using a third optical transceiver when receiving from the first optical path; and
receiving the first portion from the second optical path using the third optical transceiver following the fault on the first optical path, and receiving the second portion from the third optical path using a fourth optical transceiver following the fault on the first optical path,
wherein when receiving the first portion and the second portion from the first optical path, the third optical transceiver receives at the first transmittable bit rate, and wherein when receiving the first portion from the second optical path, the third optical transceiver receives at the second transmittable bit rate.

* * * * *